United States Patent
Katou

(10) Patent No.: US 7,626,109 B2
(45) Date of Patent: Dec. 1, 2009

(54) PERFORMANCE TEACHING APPARATUS AND PROGRAM FOR PERFORMANCE TEACHING PROCESS

(75) Inventor: Hitoshi Katou, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 457 days.

(21) Appl. No.: 11/582,888

(22) Filed: Oct. 18, 2006

(65) Prior Publication Data

US 2007/0089590 A1    Apr. 26, 2007

(30) Foreign Application Priority Data

Oct. 21, 2005   (JP) .............................. 2005-306614

(51) Int. Cl.
G09B 16/00 (2006.01)
G09B 16/02 (2006.01)
G10H 1/00 (2006.01)

(52) U.S. Cl. ........................................ 84/477 R; 84/609
(58) Field of Classification Search ............... 84/470 R, 84/477 R, 609
See application file for complete search history.

(56) References Cited

U.S. PATENT DOCUMENTS

| | | | | |
|---|---|---|---|---|
| 5,496,963 | A * | 3/1996 | Ito ............................... | 84/653 |
| 6,087,577 | A * | 7/2000 | Yahata et al. .................. | 84/478 |
| 6,211,452 | B1 * | 4/2001 | Haruyama ................ | 84/477 R |
| 6,486,388 | B2 * | 11/2002 | Akahori ........................ | 84/478 |
| 6,582,235 | B1 * | 6/2003 | Tsai et al. ............... | 434/307 A |

FOREIGN PATENT DOCUMENTS

| JP | 2000-148143 A | 5/2000 |
|---|---|---|
| JP | 2002-202777 A | 7/2002 |
| JP | 2003-66957 A | 3/2003 |
| JP | 2003-316350 A | 11/2003 |
| JP | 2004-101576 A | 4/2004 |
| JP | 2004-205629 A | 7/2004 |
| JP | 2005-241716 A | 9/2005 |

OTHER PUBLICATIONS

Japanese Office Action dated Aug. 11, 2009 (2 pages), and English translation thereof (4 pages), issued in counterpart Japanese Application Serial No. 2005-306614.

* cited by examiner

*Primary Examiner*—Jeffrey Donels
(74) *Attorney, Agent, or Firm*—Frishauf, Holtz, Goodman & Chick, P.C.

(57) ABSTRACT

In an electronic musical instrument 100, CPU confirms a pitch range of music stored in a music memory, and generates a keyboard image as large as possible for display based on marks M1 and M2 on a keyboard and the confirmed pitch range, and sends and displays the generated keyboard image on a television receiver 200, whereby a user is allowed to easily learn a relative relationship between a key position on a keyboard and a key position designated by performance guide in the keyboard image. The marks M1 and M2 are provided on the keyboard for indicating key positions corresponding respectively to reference pitches C4 and C5.

16 Claims, 30 Drawing Sheets

KEYBOARD 26A

KEYBOARD 26B

KEYBOARD 26C

KEYBOARD 26D

PERFORMANCE TEACHING APPARATUS AND PROGRAM FOR PERFORMANCE TEACHING PROCESS

CROSS-REFERENCE TO RELATED APPLICATIONS

This application is based on and claims the benefit of priority from the prior Japanese Patent Application No. 2005-306614, filed Oct. 21, 2005, the entire contents of which are incorporated herein by reference.

BACKGROUND OF THE INVENTION

1. Field of the Invention

The present invention relates to a performance teaching apparatus and a program for performance teaching process, and more particularly, to a performance teaching apparatus, which displays images of performance guide and to a program for performance teaching process.

2. Description of the Related Art

A performance teaching function for improving performing technique of a user is widely known in the field of electronic keyboard instruments. For example, an apparatus is used, in which each key of a keyboard is provided with a light emitting element such as LED (light emitting diode), and performance guide makes the light emitting elements light up keys to be played in response to note-on events included in music data of music to be played. In some apparatus, a keyboard image is displayed on its display unit such as LCD, and a key to be played is guided in the displayed keyboard image.

In a performance teaching apparatus disclosed in JP 2004-205629 A, a key-range of a keyboard is detected, and also a pitch range of music to be played with the keyboard is detected, and a keyboard image is generated and displayed based on the detected key range and pitch range. In this case, the key range to be displayed is shifted in unit of octave in accordance with the pitch range of the music.

Further, in a playing-key instructing apparatus disclosed in JP 2003-316350 A, since a wide range of keys to be played are displayed on a small key-display unit, the key-display unit is installed at a position changed in unit of octave in the vicinity of a piano keyboard on the high pitch side or the low pitch side in the direction of the key array.

But in the performance teaching apparatus disclosed in JP 2004-205629 A, when the pitch range of music is wide, it is difficult for a player to learn a relative relationship between a position of a real key to be played and a key position designated by performance guide. White keys and black keys of the keyboard are arranged in the same pattern every octave of twelve-tone scale from C sound to B sound. Therefore, even though the key range to be displayed is shifted in unit of octave in accordance with the pitch range of music, it is difficult for a player to recognize from the displayed keyboard image in which octave a key position to be played locates.

In the playing-key instructing apparatus disclosed in JP 2003-316350 A, a key position on the keyboard and a key position in the displayed keyboard coincide with each other, but the player is required to do troublesome adjustment to move and set the key-display unit on the apparatus depending on music he or she plays.

The present invention has been made to solve problems involved in the conventional apparatuses, and has an object to provide an apparatus or program which allows a user to easily become aware of a relative relationship between a key position of a keyboard and a key position in a keyboard image displayed in accordance with performance guide.

SUMMARY OF THE INVENTION

According to one aspect of the present invention, there is provided a performance teaching apparatus used with a display device, which comprises a keyboard having a mark indicating a position of a key corresponding to a reference pitch, a music search unit for confirming a pitch range of music to be played, an image generating unit for generating a keyboard image corresponding to the pitch range confirmed by the music search unit based on the mark of the keyboard, and for generating a guide image for performance guide, and an image outputting unit for outputting to the display device the keyboard image and guide image generated by the image generating unit.

According to another aspect of the present invention, there is provided a computer readable recording medium storing a computer program for performance teaching process, which computer program makes a computer confirm a pitch range of music to be played, and generate a keyboard image based on a mark provided on a keyboard for indicating a position of a key corresponding to a reference pitch and the confirmed pitch range, and a guide image for performance guide, and further output to a display device the generated keyboard image and guide image.

DETAILED DESCRIPTION OF PREFERRED EMBODIMENTS

Now, as an example of a musical-performance teaching apparatus according to the present invention, an embodiment of the musical performance system comprising an electronic musical instrument and a television receiver will be described in detail with reference to the accompanying drawings.

Figure 1:
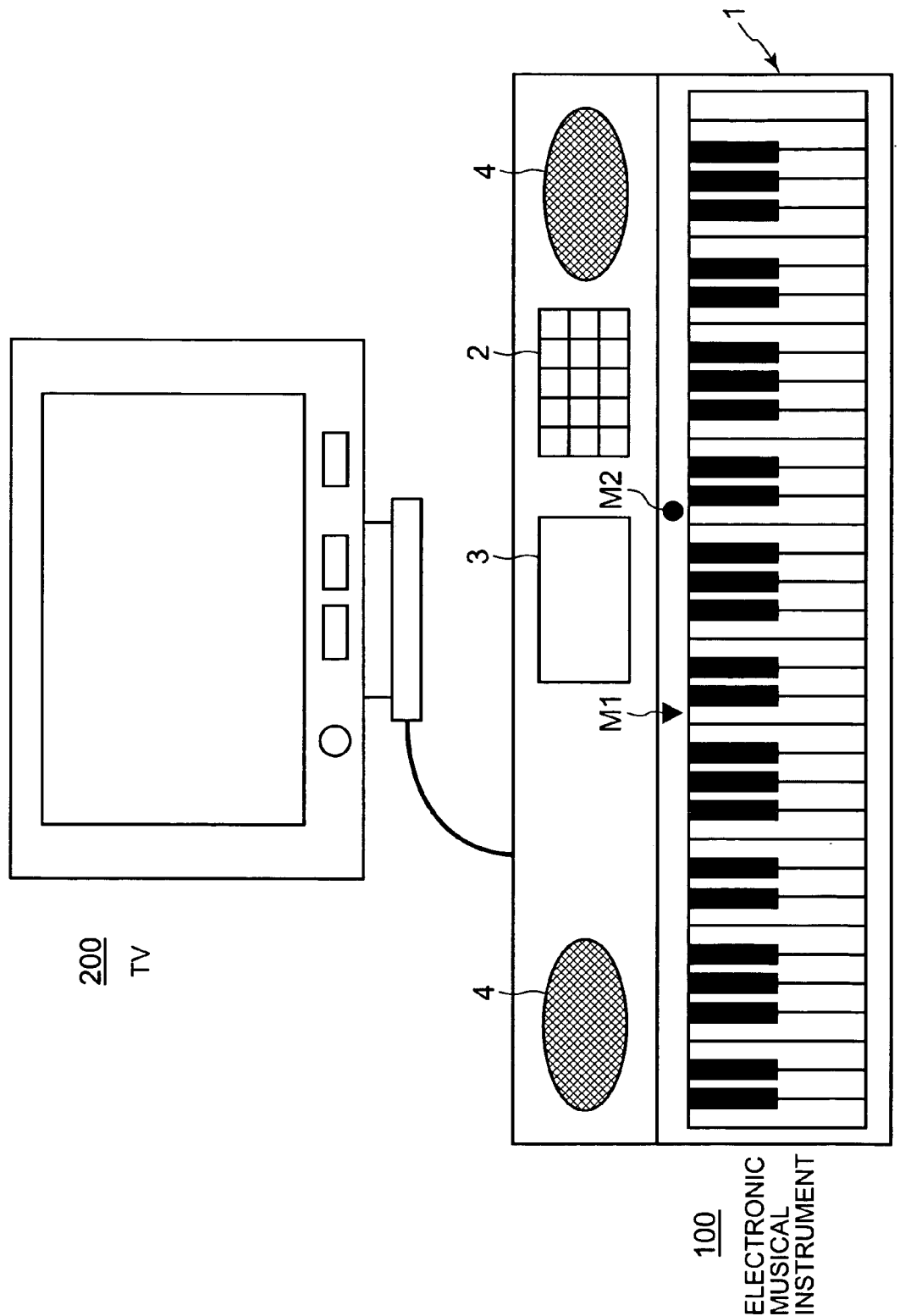
FIG. 1 is view illustrating a configuration of a musical performance system according to an embodiment of the present invention.

FIG. 1 is a view illustrating an embodiment of the musical performance system, wherein an electronic musical instrument 100 is connected with a television receiver 200.

The electronic musical instrument 100 is provided with a keyboard 1, switch unit 2, display unit 3, and a left side speaker 4 and a right side speaker 4. An image for playing the keyboard 1 is sent to and displayed on the television receiver 200, as will be described in detail hereinafter. The keyboard 1 has 61 keys (36 white keys and 25 black keys). A mark of "▼" M1 and mark of "●" M2 appearing on the upper side of the keyboard are incused or printed at positions of C4 (Middle C) key and C5 key, respectively.

Figure 2:
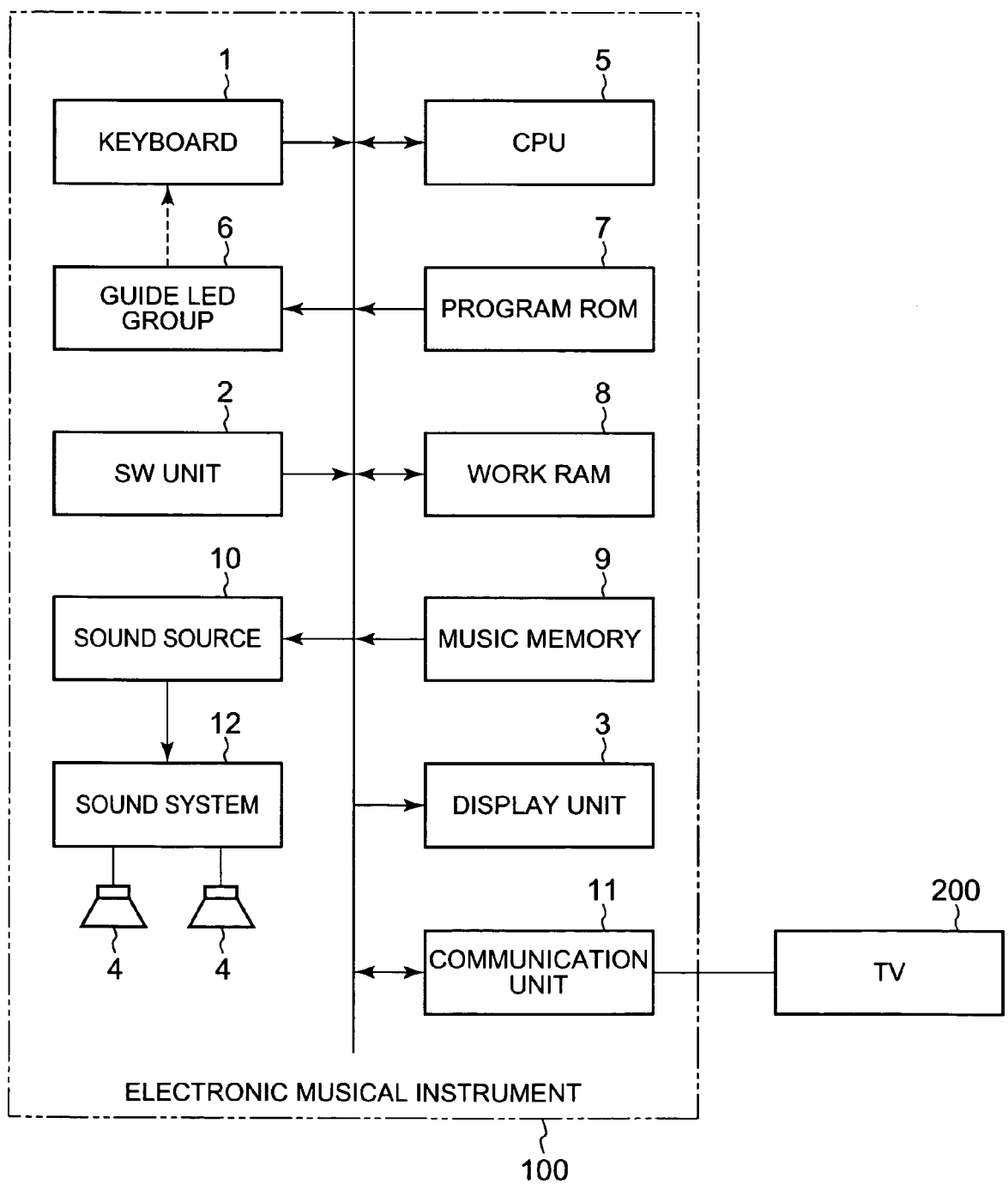
FIG. 2 is a view illustrating a circuit configuration of an electronic musical instrument shown in FIG. 1.

FIG. 2 is a block diagram illustrating an internal configuration of the electronic musical instrument 100. As illustrated in FIG. 2, CPU 5 is connected with the keyboard 1, switch unit 2 and display unit 3 shown in FIG. 1 through a system bus, and further connected with various units such as a guide LED group 6, program ROM 7, work memory RAM 8, music memory 9, sound source 10, and a communication unit 11. CPU 5 exchanges data and commands with these units, thereby controlling whole operation of the electronic musical instrument 100. The guide LED group 6 comprises plural LEDs which are provided for keys of the keyboard 1, respectively.

The switch unit 2 includes a music selection switch for selecting music to play, a right hand play switch for setting a lesson part for right hand play, a left hand play switch for setting a lesson part for left hand play, a both hands play switch for setting a lesson part for both hands play, a lesson 1 switch, lesson 2 switch, and lesson 3 switch for setting a lesson method, and a start/stop switch for starting and/or stopping a performance. A lesson 1 represents a lesson in "any key mode", in which music keeps advancing regardless of note-on data of music even though any key is played. A lesson 2 represents a lesson in a "stand-by mode", in which music stays at the same position until a correct key is played. A lesson 3 represents a lesson in a "self advancing mode", in which music advances regardless of whether a key is played or not.

The display unit 3 displays data and commands entered in response to operation of the switch unit 2 by a player, and a message to the player. The display unit 3 is also capable of displaying a performance guide image for guiding keyboard performance in place of a video of the television receiver 200 or together with the video of the television receiver 200. The player is allowed to set whether to display the performance guide image on the television receiver 200 or on the display unit 3, or to display the performance guide image both on television receiver 200 and the display unit 3.

The program ROM 7 previously stores a program for a performance teaching process to be executed by CPU 5, image data for generating a keyboard image for one octave, image data for displaying fingering in the performance guide image, and initial data. The work RAM 8 temporarily stores data and commands processed by CPU 5, and have an area for registers and flags necessary to execute the program for performance teaching process.

The sound source 10 generates music wave data in response to data input by playing the keyboard 1, and supplies the generated music wave data to the sound system 12. The sound system 12 comprises D/A converter circuit, filtering circuit and amplifier (not shown). The sound system 12 converts the digital music wave data supplied from the sound source 10 into an analog signal, and amplifies the analog signal, outputting the same signal from the speaker 4.

The communication unit 11 transfers the keyboard image and performance guide image to the television receiver 200 under communication control by CPU 5.

Figure 3:
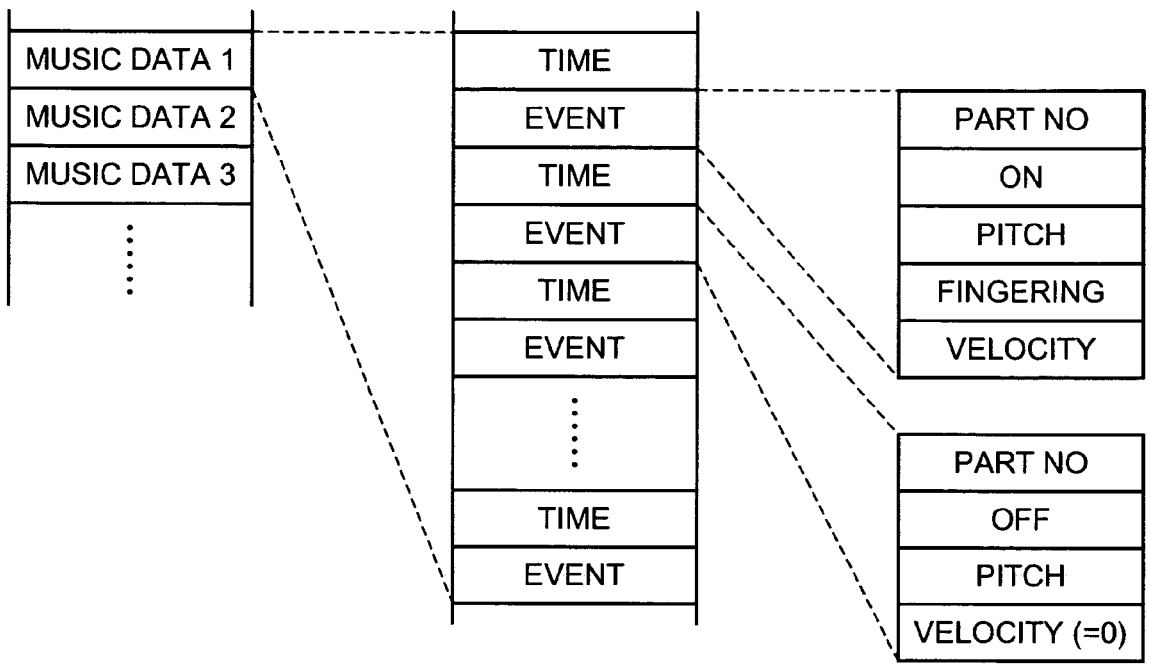
FIG. 3 is a view illustrating a structure of music data stored in music memory shown in FIG. 2.

The music memory 9 stores plural pieces of music data. FIG. 3 is a view illustrating a structure of music data stored in the music memory 9. The music data is sequence data including time data and event data which are arranged alternately, as shown in FIG. 3. In practice, in the music data are included control data such as key signatures, expression marks, time signatures, bar lines and program changes, but description thereof is omitted from for simplicity. There are two kinds of event data, i.e., a note-on event for instructing producing a sound, and a note-off event for instructing ceasing a sound. The note-on event includes a part number for indicating whether the part is for right hand play or for left hand play, a flag indicating note-on, fingering data for indicating a finger used to play a key, and a velocity for indicating a sound volume. Meanwhile, the note-off event includes a part number, a flag indicating note-off, and a velocity for indicating a sound volume of "0".

Now, operation of the electronic musical instrument will be described with reference to flow charts of processes executed by CPU 5, images to be displayed on the television receiver 200, and other drawings.

Figure 4:
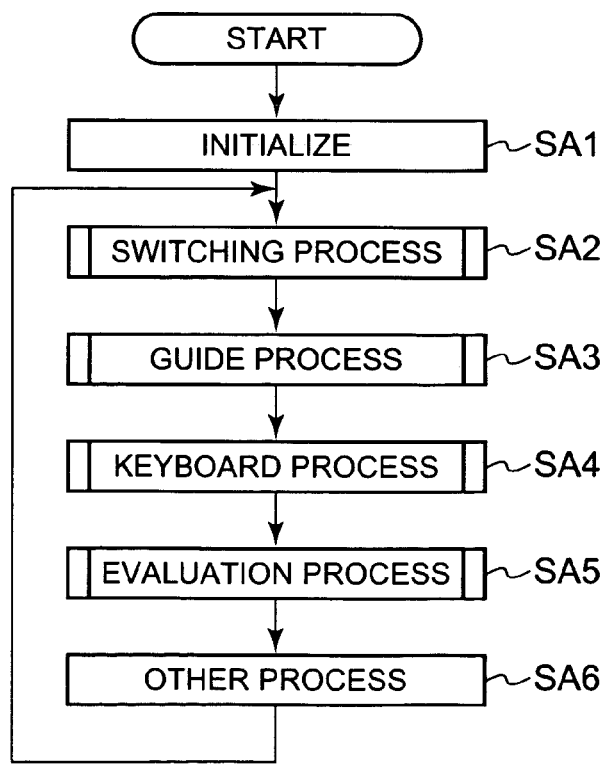
FIG. 4 is a flow chart of a main routine process executed by CPU.

FIG. 4 is a flow chart of a main routine process executed by CPU 5. An initializing process is executed at step SA1. Thereafter, a switching process, guide process, keyboard process, evaluation process and other process are repeatedly executed by CPU 5 at steps SA2, SA3, SA4, SA5, and SA6. In other process is included a process for transferring image data to the television receiver 200.

Figure 5:
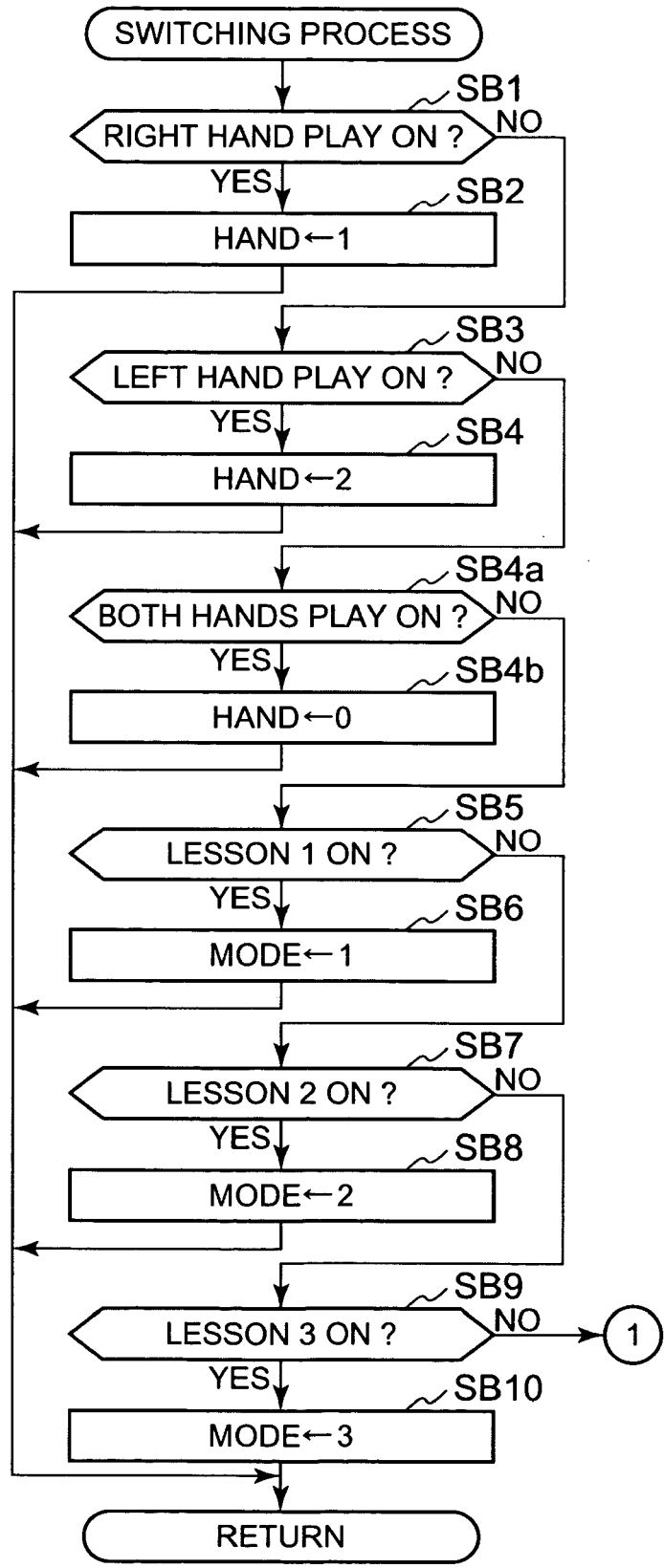
FIG. 5 is a flow chart of a switching process in the main routine process shown in FIG. 4.
Figure 6:
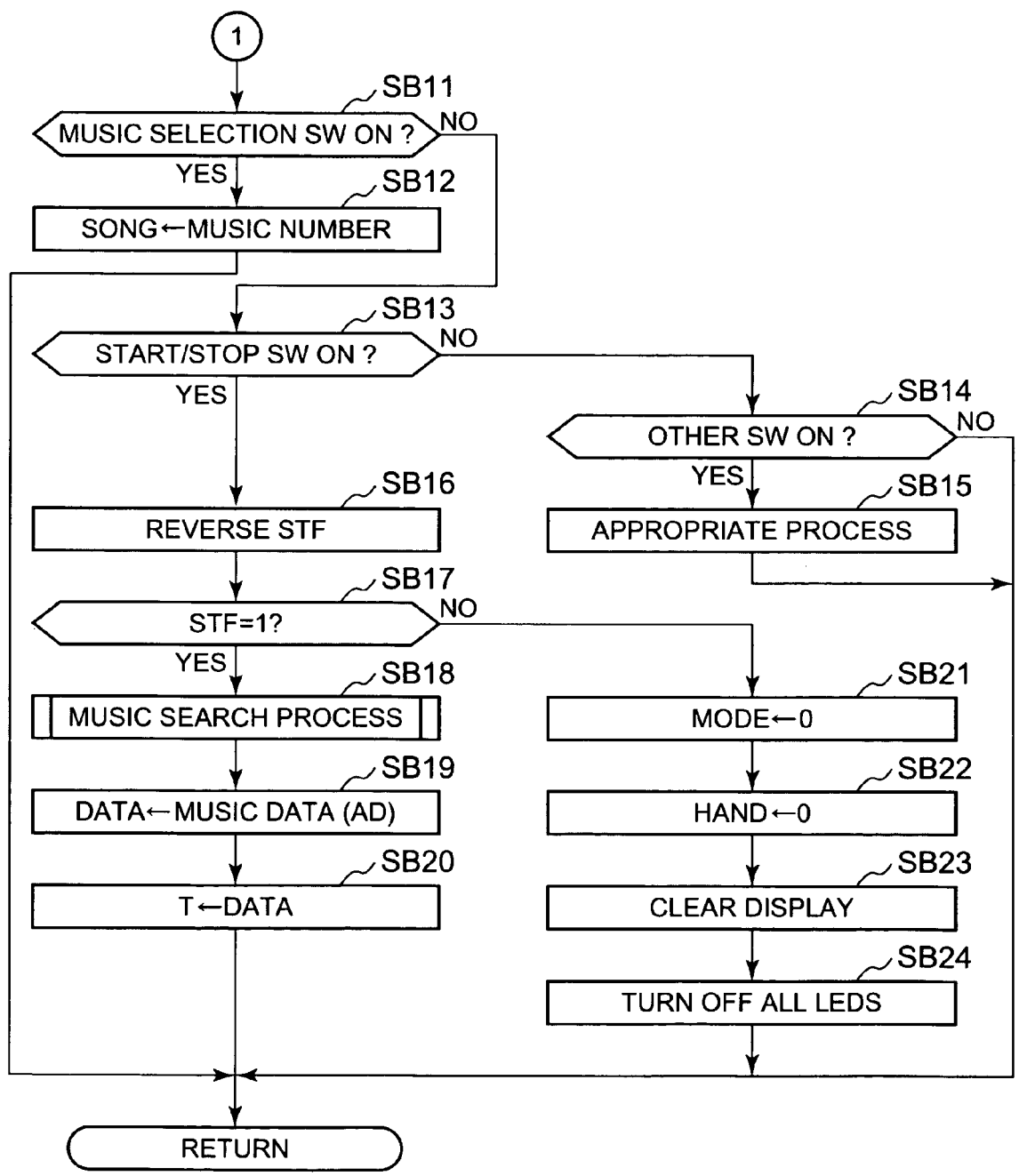
FIG. 6 is a flow chart of the switching process following the flow chart of FIG. 5.

FIGS. 5 and 6 are flow charts of the switching process at step SA2 in the main routine process of FIG. 4. In the switching process, processes are executed in response to operation of the switch unit 2. At step SB1 in FIG. 5, it is judged whether or not the right hand play switch has been turned on. When the right hand play switch has been turned on (YES at SB1), a value of "1" is set to a register HAND at step SB2. When the right hand play switch has not been turned on (NO at step SB1), it is judged at step SB3 whether or not the left hand play switch has been turned on. When the left hand play switch has been turned on (YES at SB3), a value of "2" is set to the register HAND at step SB4. When the left hand play switch has not been turned on (NO at step SB3), it is judged at step SB4a whether or not the both hands play switch has been turned on. When the both hands play switch has been turned on (YES at step SB4a), a value of "0" is set to the register HAND at step SB4b. Note that the initial value set to the register HAND is "0", and a both hands play mode has been set.

When any play switch has not been set, it is judged at step SB5 whether the lesson 1 switch has been turned on. When the lesson 1 switch has been turned on (YES at step SB5), a value of "1" is set to a register MODE at step SB6. When the lesson 1 switch has not been turned on (NO at step SB5), it is judged at step SB7 whether or not the lesson 2 switch has been turned on. When the lesson 2 switch has been turned on (YES at step SB7), a value of "2" is set to the register MODE at step SB8. When the lesson 2 switch has not been turned on (NO at step SB7), it is judged at step SB9 whether or not the lesson 3 switch has been turned on. When the lesson 3 switch has been turned on (YES at step SB9), a value of "3" is set to the register MODE at step SB10. Note that when the register MODE has been set to a value of "0", a manual play mode is set, and therefore it is not judged whether or not the register MODE has been set to a value of "0".

When any lesson switch has not been turned on, it is judged at step SB11 in FIG. 6 whether or not the music selection switch has been turned on. When the music selection switch has been turned on (YES at step SB11), a selected music number is set to a register SONG at step SB12. When the music selection switch has not been turned on (NO at step SB11), it is judged at step SB13 whether or not the start/stop switch has been turned on. When the start/stop switch has not been turned on (NO at step SB13), it is judged at step SB14 whether or not other switch has been turned on. When the other switch has been turned on (YES at step SB14), an appropriate process is executed at step SB15. When the start/stop switch has been turned on (YES at step SB13), a value of flag STF is reversed at step SB16. Thereafter, it is judged at step SB17 whether or not the flag STF has been set to "1" (Performance Start). When the flag STF has been set to "1", a music search process is executed at step SB18.

Figure 7:
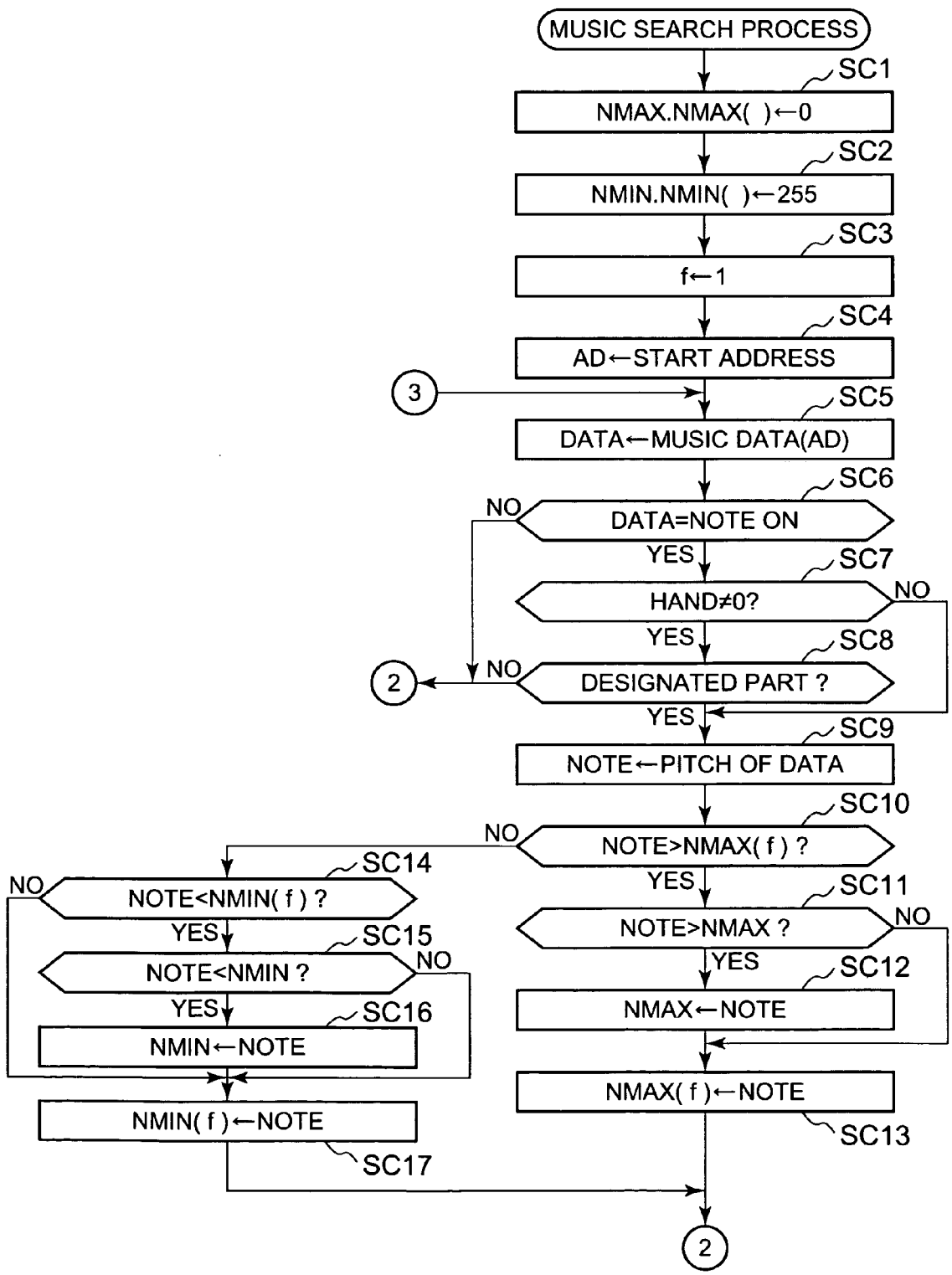
FIG. 7 is a flow chart of a music search process in the switching process shown in FIG. 6.
Figure 8:
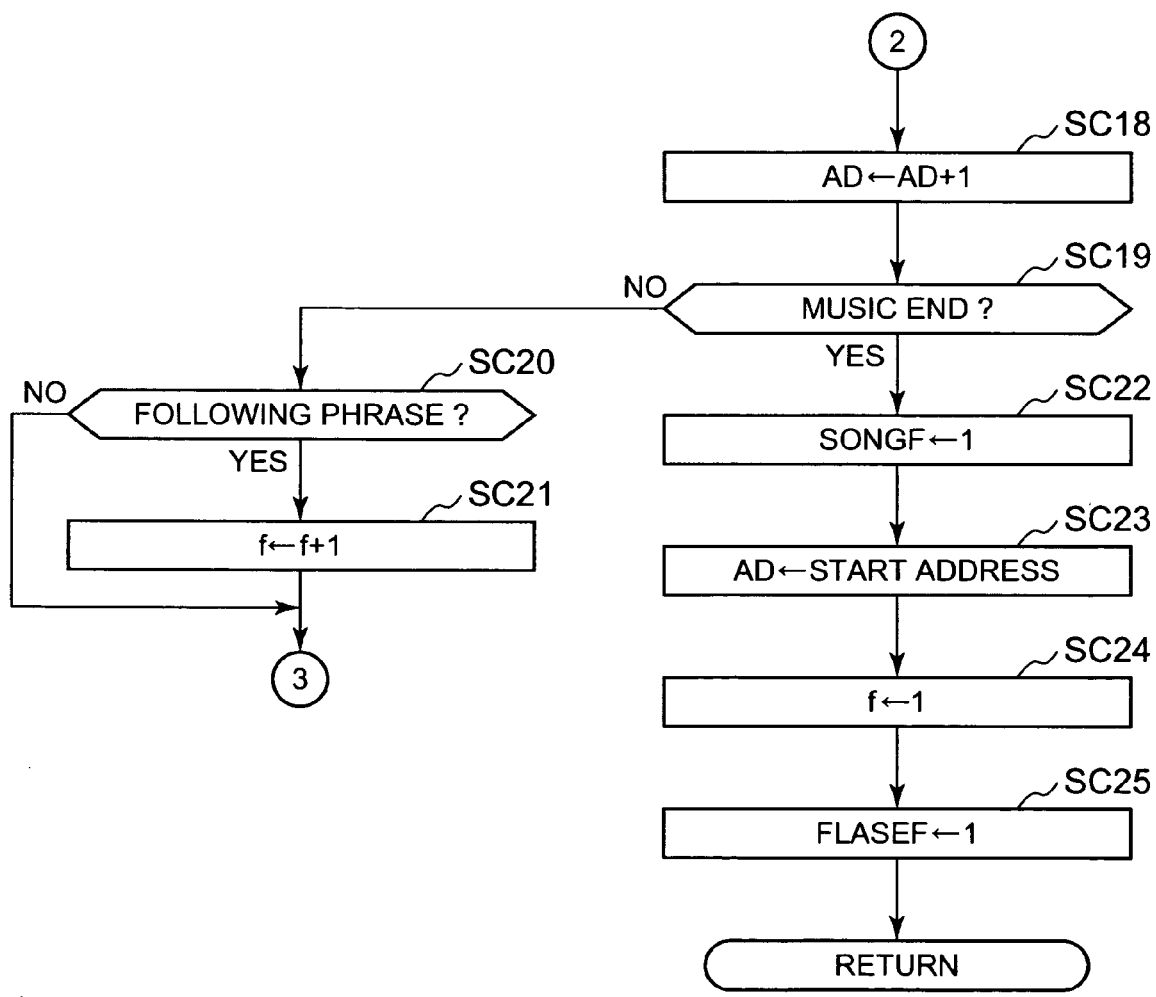
FIG. 8 is a flow chart of the music search process following the flow chart of FIG. 7.

FIGS. 7 and 8 are flow charts of the music search process. At step SC1 in FIG. 7, a value of "0" is stored in a register NMAX and register arrangement NMAX ( ), and a value of "255" is stored in a register NMIN and register arrangement NMIN( ) at step SC2. The resister NMAX holds the upper limit (or highest note) of the pitch range of the whole part of music, and the register NMIN holds the lowest limit (or lowest note) of the pitch range of the whole part of the music. The resister arrangement NMAX ( ) holds the highest limit (or highest note) of the pitch range of each musical phrase to be played, and the register arrangement NMIN ( ) holds the lowest limit (or lowest note) of the pitch range of each musical phrase to be played. The keyboard 1 of the electronic musical instrument 100 shown in FIG. 1 has 61 keys, and the lowest note of the key range to be played with the keyboard 1 corresponds to C2 (36), and the highest note of the key range to be played with the keyboard 1 corresponds to B6 (96). Therefore, music which can be played with the electronic musical instrument 100 is one falling within the pitch range between C2 and B6. That is, a value (low note) of "0" that is lower than the value of "36", i.e. the lowest limit of the keyboard 1 is stored in the register NMAX and register arrangement NMAX ( ) at step SC1, and a value (high note) of "255" that is higher than the value of "96", i.e. the highest limit of the keyboard 1 is stored in the register NMIN and register arrangement NMIN( ) at step SC2.

Thereafter, a value of "1" (number of the first phrase) is set to a pointer "f" which indicates the number of musical phrase at step SC3, and the starting address of music is set to an address register AD at step SC4. Then, a loop process from steps SC5 to SC21 (FIG. 8) is repeatedly executed, whereby the pitch range of music to be played is searched. At the first loop process, music data (AD) designated by the address of the address register (AD) is stored in a register DATA at step SC5. Then, it is judged at step SC6 whether or not the data stored in the register DATA is a note-on event. When the data stored in the register DATA is a note-on event (YES at step SC6), it is judged at step SC7 whether the current value of the register HAND is "0" (both hands play), or a value other than "0", i.e. "1" (right hand play) or "2" (left hand play). When the value of the register HAND has been set to "1" or "2" (YES at step SC7), it is judged at step SC8 whether the note-on event is an event for a part designated for right hand play or for left hand play or not. When the note-on event is an event for a part designated for right hand play or an event for a part designated for left hand play (YES at step SC8), a pitch stored in the register DATA is stored in a register NOTE at step SC9.

Next, it is judged at step SC10 whether or not the pitch stored in the register NOTE is higher than a pitch of the register arrangement NMAX (f) designated with the phrase number "f". When the pitch of the register NOTE is higher than the pitch of the register arrangement NMAX (f) (YES at step SC10), it is judged at step SC11 whether or not the pitch of the register NOTE is higher than a pitch of the register NMAX (f). Initially, both the pitch of register NMAX (f) and the pitch of register NMAX have been set to a value of "0". In this case, the pitch of the register NOTE is stored in the register NMAX at step SC12, and the pitch of the register NOTE is stored in the register arrangement NMAX (f) at step SC13. After the step SC13, or when it is determined at step SC6 that the data of the register DATA is not a note-on event (NO at step SC6), or when it is determined at step SC8 that the note-on event is not an event for the part designated for right hand play or for left hand play (NO at step SC8), the address of the register AD is incremented at step SC 18 in FIG. 8. It is judged at step SC19 whether or not music data of the incremented register AD is END and has come to its end. When the music data has not yet come to the end (NO at step SC19), it is judged at step SC20 whether or not the music data of the incremented register AD has moved to the following phrase. When the music data has moved to the following phrase (YES at step SC20), the phrase number "f" is incremented at step SC21. After the phrase number "f" is incremented at step SC21, or when the music data has not moved to the following phrase (NO at step SC20), operation returns to step SC5 in FIG. 7, where music data (AD) is stored in the register DATA.

Thereafter, when music data stored in the register DATA is a note-on event relating performance, the note-on event stored in the register DATA is stored in the register NOTE at step SC9. The pitch stored in the register NOTE is compared with the pitch stored in the register NMAX(f) at step SC10. When the pitches to be compared with each other are for the same phrase, the pitch of the register NOTE is stored in the register NMAX(f) only when the pitch of the register NOTE is higher than the pitch of the register NMAX(f). When a play part moves to the following phrase, the pitch of the register NOTE is stored in the register NMAX(f), but when the pitch of the register NOTE is not higher than the pitch of the register NMAX, the pitch of the register NMAX is not changed.

When it is determined at step SC10 that the pitch stored in the register NOTE is not higher than the pitch stored in the register NMAX(f) (NO at step SC10), it is judged at step SC14 whether or not the pitch stored in the register NOTE is lower than the pitch stored in the register NMIN(f). When the pitch of the register NOTE is lower than the pitch of the register NMIN(f) (YES at step SC14), it is further judged at step SC15 whether or not the pitch of the register NOTE is lower than the pitch of the register NMIN. Initially, both the pitch of the register NMIN(f) and the pitch of the register NMIN have been set to a value of "255". In this case, the pitch of the register NOTE is stored in the register NMIN at step SC16, and the pitch of the register NOTE is stored in the register NMIN(f) at step SC17. After the process has been executed at step SC17, operation advances to step SC18 in FIG. 8.

In the following loop process, when it is determined at step SC14 that the pitch of the register DATA which is stored in the register NOTE at step SC9 in FIG. 7 is lower than the pitch of NMIN(f) (NO at step SC14), or when it is determined that the pitch of the register DATA which is stored in the register NOTE is not higher than the pitch of NMAX(f) in the following phrase, the pitch of the register NOTE is stored in the register NMIN(f) at step SC17. But when it is determined at step SC15 that the pitch of the register NOTE is not lower than the pitch of the register NMIN, the pitch of the register NMIN is not changed.

Therefore, the loop process from step SC5 to SC21 is repeatedly executed as the address of the music data advances, and when the music data has come to its end at step SC19, the highest pitch in each phrase "i" is held in the register NMAX(i) and the lowest pitch in each phrase "i" is kept in the register NMIN (i). Further, the highest pitch in the whole music is kept in the register NMAX and the lowest pitch in each phrase "i" is held in the register NMIN. That is, the pitch range of each phrase and the pitch range of the whole music are held on the work RAM 8.

When the music data has come to its end at step SC19 in FIG. 8, a music search flag SONGF is set to "1" at step SC22. The starting address of the music data is set to the address register AD at step SC23. A value of "1" is set to the phrase number "f" at step SC24. Then, a value of "1" is set to a flag FLASEF representing start of a phrase at step SC25, and operation returns to step SB18 in FIG. 6.

After the music search process has been executed at step BS18 in FIG. 6, music data stored in the address register AD is stored in the register DATA at step SB19. The music data at the start address set to the register AD is time data as illustrated in FIG. 3, and therefore the time data of the register DATA is stored in a time register T at step SB20. Then, operation returns to the main routine process.

Meanwhile, when it is determined that the flag STF has been set to "0" (performance stop) (NO at step SB17 in FIG. 7), a value of "0" is set to the register MODE (manual performance) at step SB21. A value of "0" is set to the register HAND (both hands play) at step SB22. Then, CPU 5 clears all the display at step SB23, turning off all LEDs at step SB24, and returns to the main routine process.

Figure 9:
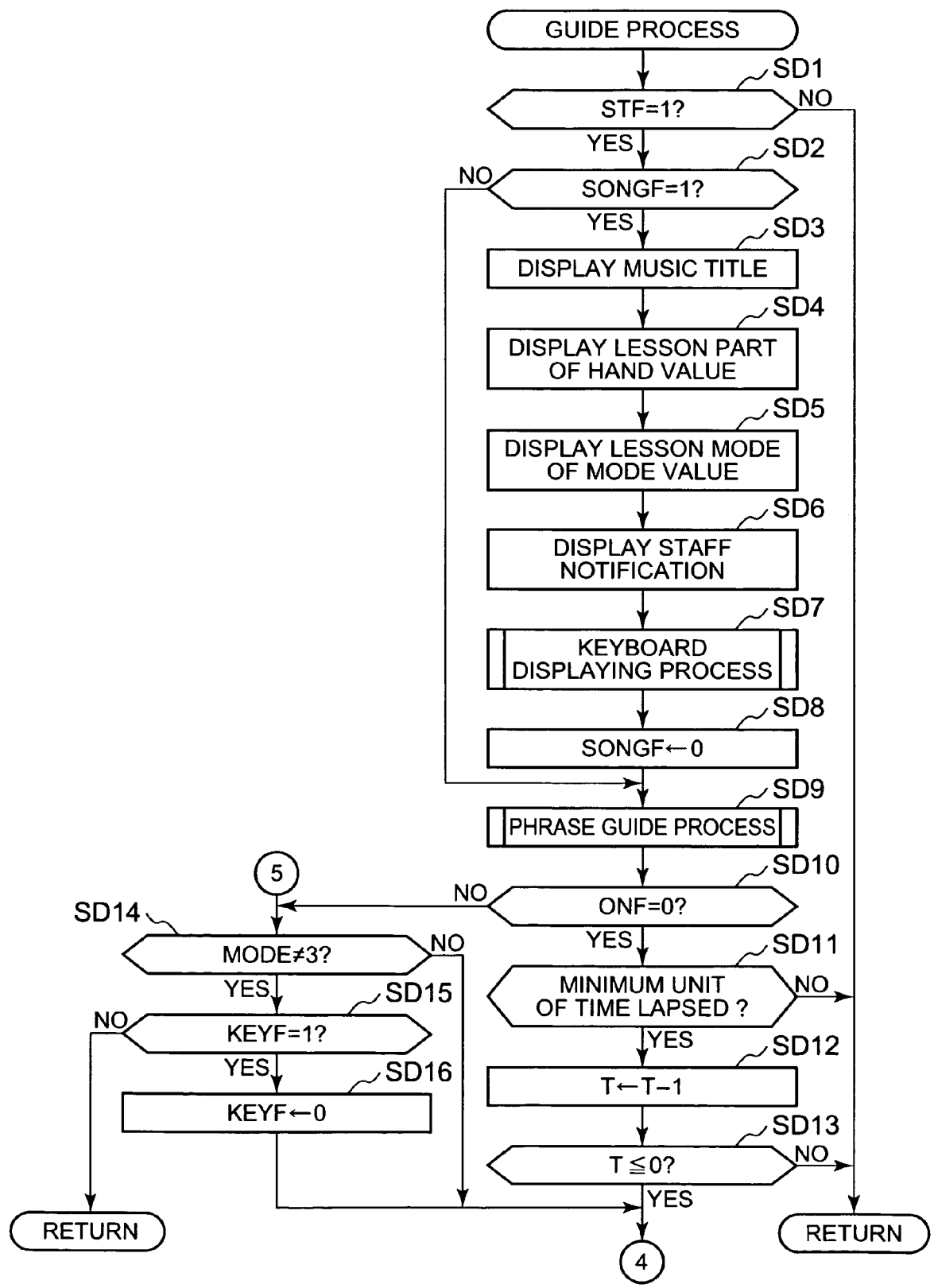
FIG. 9 is a flow chart of a guide process in the main routine process shown in FIG. 4.
Figure 10:
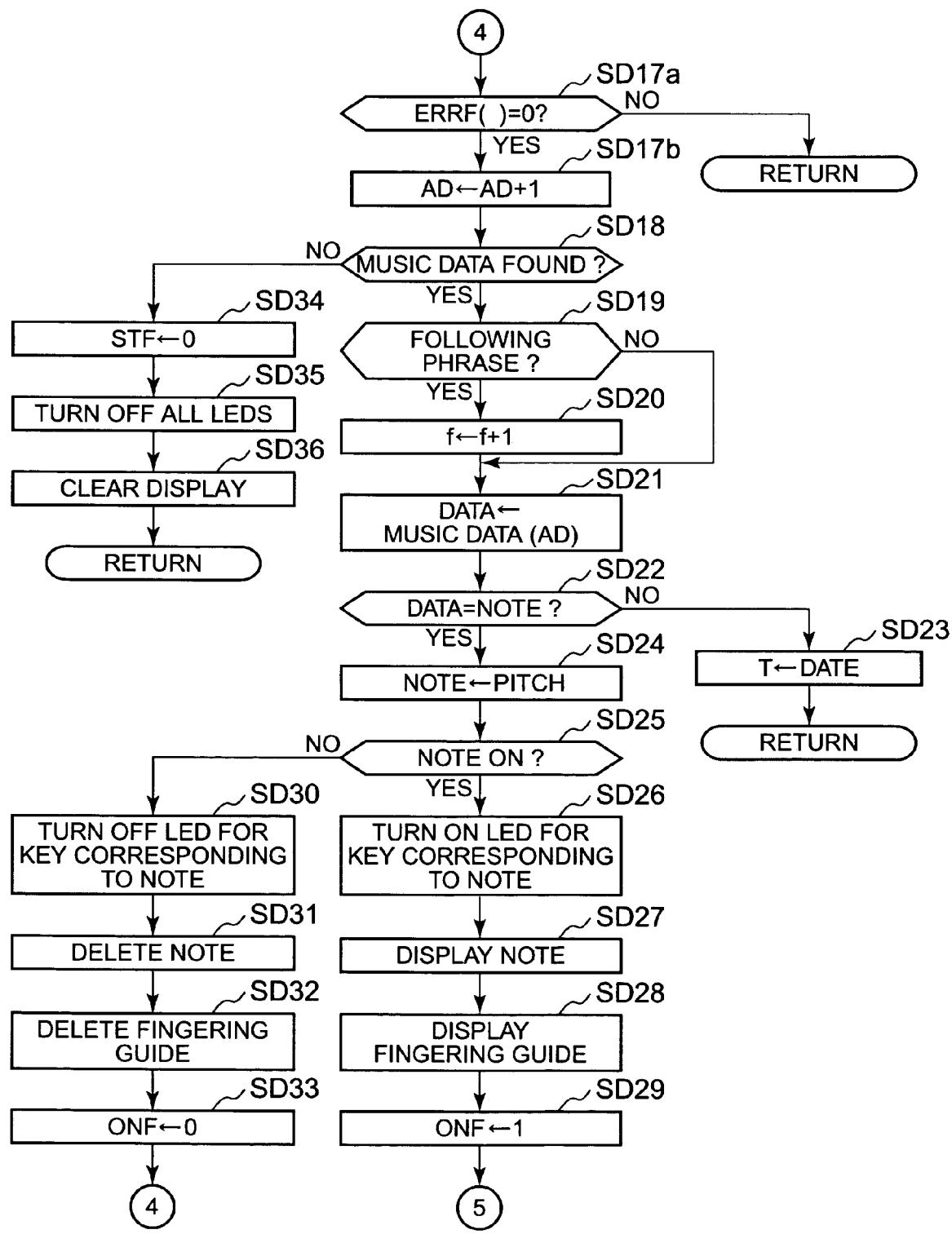
FIG. 10 is a flow chart of the guide process following the flow chart of FIG. 9.

FIGS. 9 and 10 are flow charts of the guide process at step SA3 in the main routine process shown in FIG. 3. It is judged at step SD1 whether or not the flag STF has been set to a value of "1". When the flag STF has been set to "0" (NO at step SD1), operation returns to the main routine process. When the flag STF has been set to "1" (YES at step SD1), it is judged at step SD2 whether or not the music search flag SONGF is set to "1". When the music search flag SONGF is set to "1" (YES at step SD2), the music search process (FIGS. 7 and 8) is executed, wherein the pitch range in each phrase and the pitch range in whole music are stored on the work RAM 8, and whereby a performance lesson for playing music has been prepared. Image data for the performance lesson is transferred to and displayed on the television receiver 200. A music title selected and stored in the register SONG is transferred to and displayed on the television receiver 200 at step SD3. A lesson part designated by a value of the register HAND is displayed at step SD4, and further a lesson mode designated by a value of the register MODE is displayed at step SD5. Thereafter, a staff notation is displayed on the television receiver 200 at step SD6. Then, a keyboard displaying process is executed at step SD7.

FIG. 15A to FIG. 17 are views illustrating types of displayed keyboard images. In the present embodiment, keyboard images of a 17 white-key keyboard (29 keys), a 26 white-key keyboard (44 keys), and a full keyboard (61 keys) are displayed on the television receiver 200. In FIGS. 15A to 17, a mark of "▼" and mark of "●" correspond respectively to the mark of "▼" M1 and mark of "●" M2 incused or printed on the upper side of the keyboard 1 shown in FIG. 1, and indicate the positions of C4 (Middle C) key and C5 key, respectively.

Figure 15A:
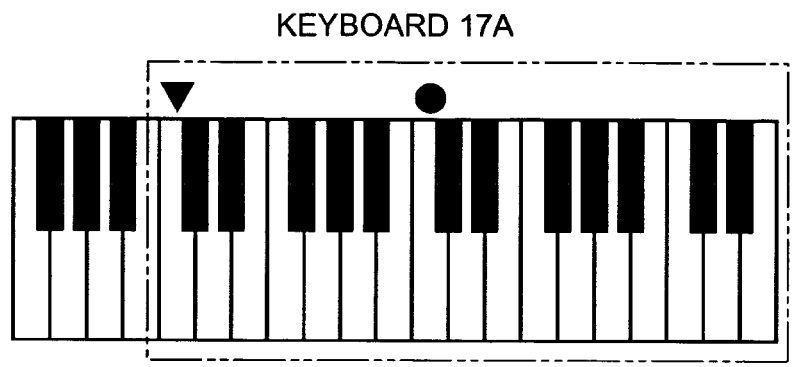
FIGS. 15A to 15C are views illustrating keyboard images of keyboards of type 17 displayed on a display of a television receiver shown in FIG. 1.
Figure 15B:
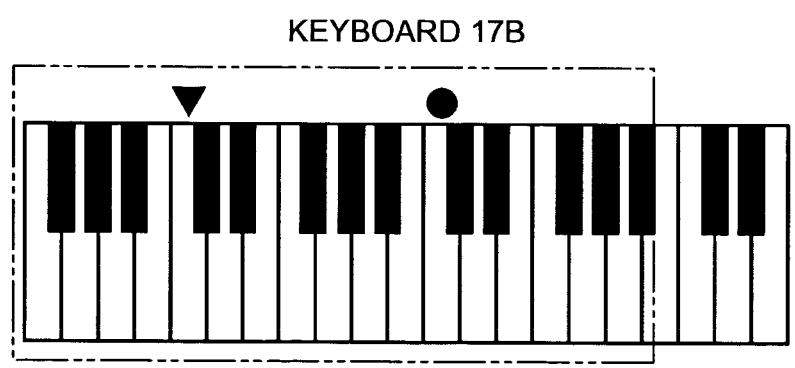
Figure 15C:
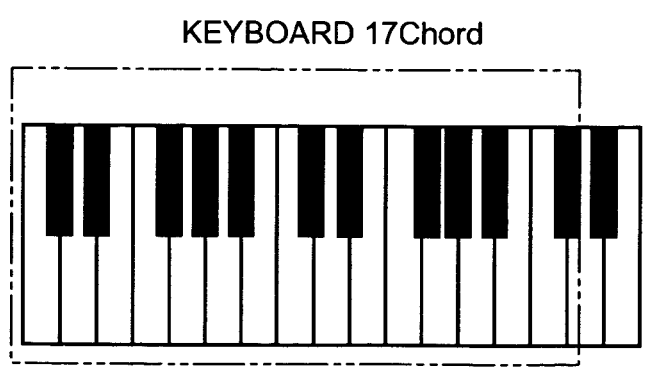

FIGS. 15A, 15B and 15c are views illustrating keyboard images of 3 types of 17 white-key keyboards. FIG. 15A is a view illustrating a keyboard image corresponding to a key range from C3 to E5 ("keyboard type 17A"). FIG. 15B is a view illustrating a keyboard image corresponding to a key range from F2 to A4 ("keyboard type 17B"). FIG. 15C is a view illustrating a keyboard image corresponding to a key range of a chord for left hand play ("keyboard type 17 Chord").

Figure 16A:
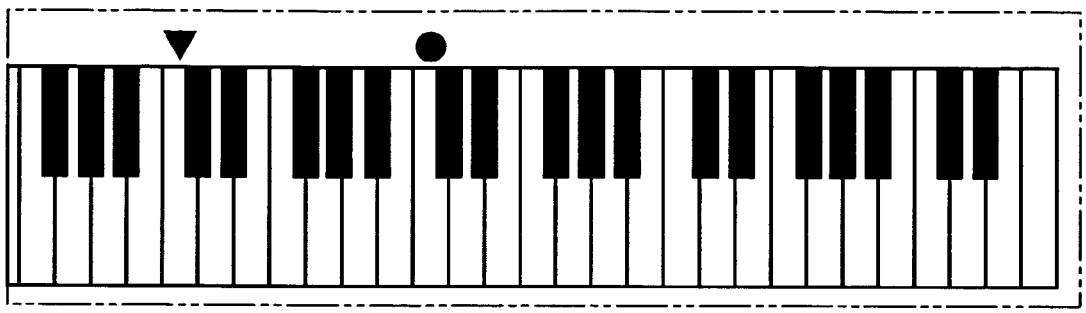
FIGS. 16A to 16D are views illustrating keyboard images of keyboards of type 26 displayed on the display of the television receiver shown in FIG. 1.
Figure 16B:
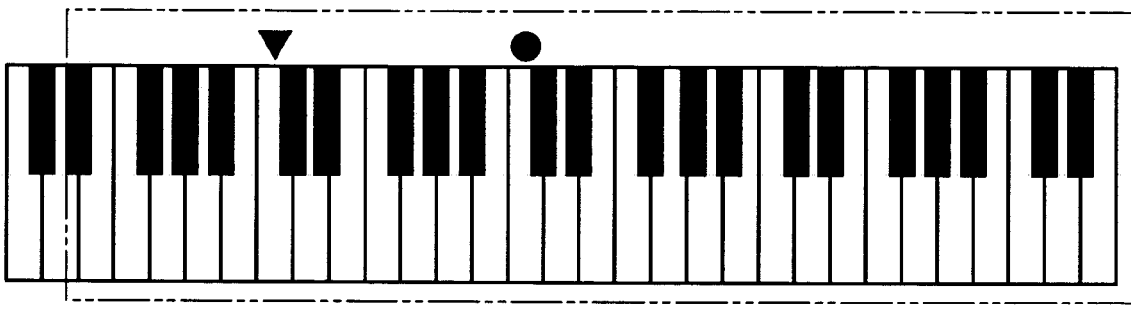
Figure 16C:
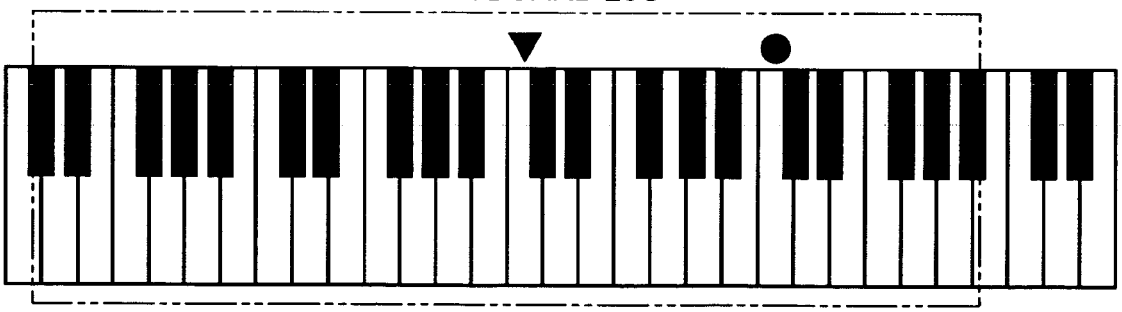
Figure 16D:
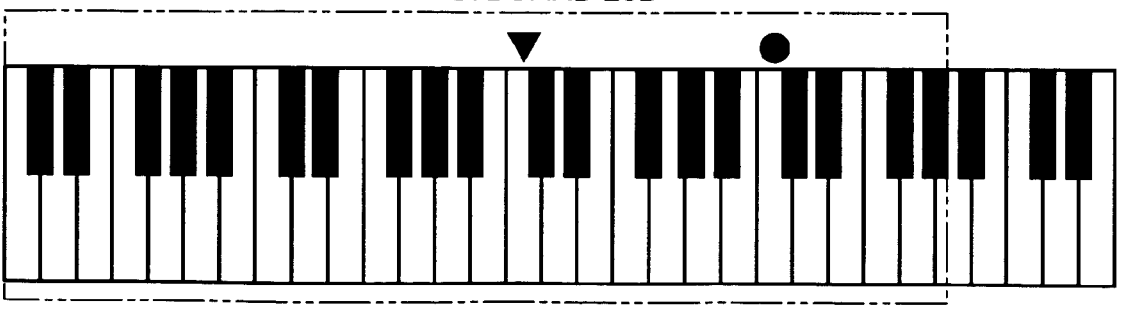
Figure 17:
FIG. 17 is a view illustrating a keyboard image of a keyboard of type 61 displayed on the display of the television receiver shown in FIG. 1.

FIGS. 16A, 16B, 16C and 16D are views illustrating keyboard images of 3 types of 26 white-key keyboards. FIG. 16A is a view illustrating a keyboard image corresponding to a key range from F3 to C7 ("keyboard type 26A"). FIG. 16B is a view illustrating a keyboard image corresponding to a key range from E3 to B6 ("keyboard type 26B"). FIG. 16C is a view illustrating a keyboard image corresponding to a key range from D2 to A6 ("keyboard type 26C"). FIG. 16D is a view illustrating a keyboard image corresponding to a key range from C2 to G5 ("keyboard type 26D"). FIG. 17 is a view illustrating a keyboard image of the full key range from C2 to C7 ("keyboard type 61A").

Figure 11:
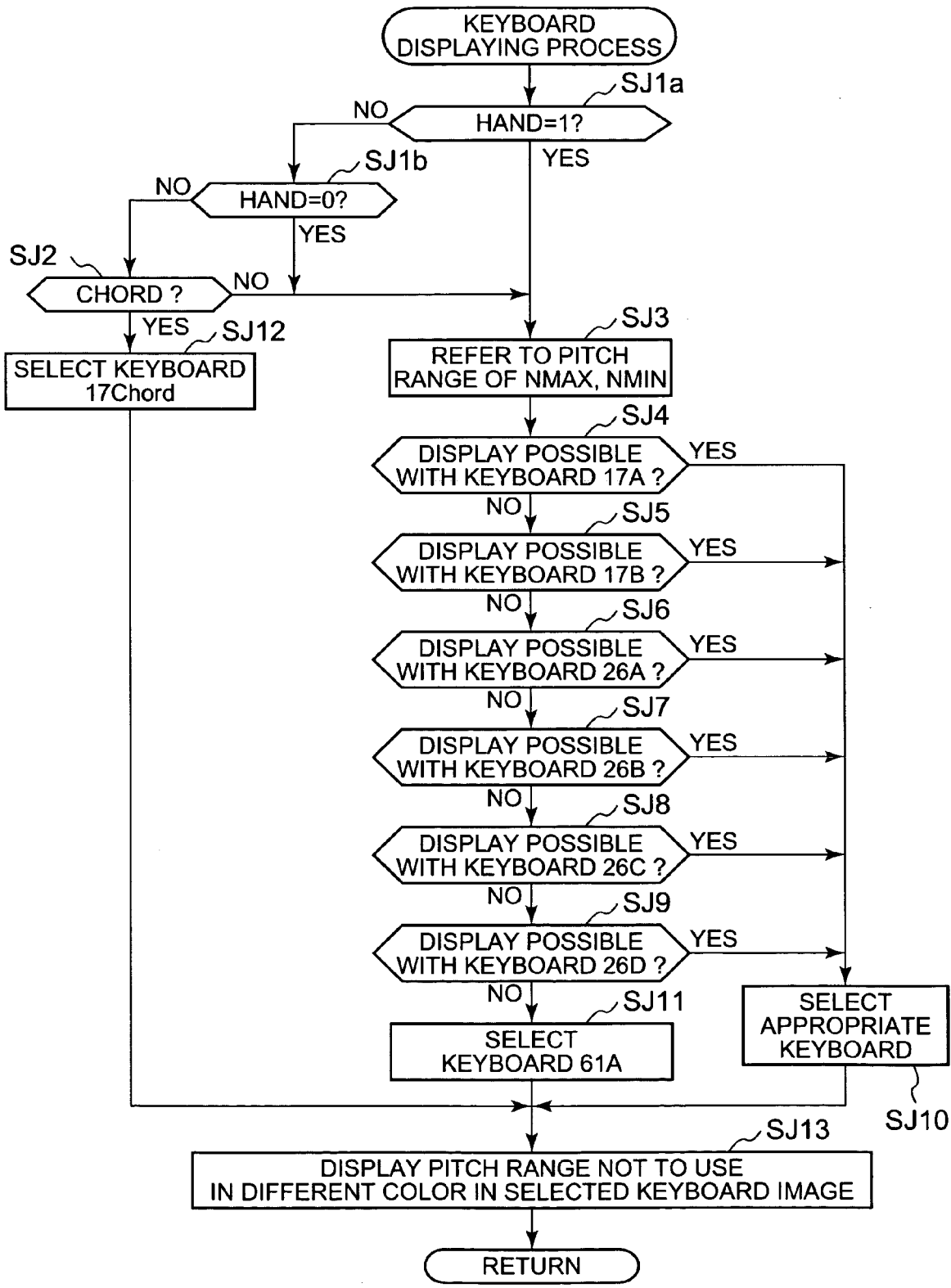
FIG. 11 is a flow chart of a keyboard image displaying process in the guide process shown in FIG. 9.

FIG. 11 is a flow chart of the keyboard displaying process at step SD7 in the guide process shown in FIG. 9. It is judged at step SJ1*a* whether or not the register HAND has been set to a value "1" (right hand play). When the register HAND has not been set to a value "1" (NO at step SJ1*a*), it is judged at step SJ1*b* whether or not the register HAND has been set to a value "0" (both hands play). When the register HAND has not been set to a value "0" (NO at step SJ1*b*), that is, when the register HAND has been set to a value "2" (left hand play), it is judged at step SJ2 whether or not music to be played is chord music. When it is determined at step SJ1*a* that the register HAND has been set to a value "1" (YES at step SJ1*a*), or when it is determined at step SJ1*b* that the register HAND has been set to a value "0" (YES at step SJ1*b*), or when it is determined at step SJ2 that music to be played is not chord music (NO at step SJ2), values (pitches of music to be played) stored in the registers NMAX and NMIN are referred to on the work RAM 8 at step SJ3.

Each of the keyboard images shown in FIG. 15A to FIG. 17 is judged if it is appropriate for the values of the registers NMAX and NMIN, and can be displayed. The judgment of the keyboard image is made as follows. It is judged at step SJ4 whether or not a keyboard can be displayed as the "keyboard type 17A". When it is determined at step SJ4 that the keyboard cannot be displayed as the "keyboard type 17A" (NO at step SJ4), it is judged at step SJ5 whether or not the keyboard can be displayed as the "keyboard type 17B". When it is determined at step SJ5 that the keyboard cannot be displayed as the "keyboard type 17B" (NO at step SJ5), it is judged at step SJ6 whether or not the keyboard can be displayed as the "keyboard type 26A". When it is determined at step SJ6 that the keyboard cannot be displayed as the "keyboard type 26A" (NO at step SJ6), it is judged at step SJ7 whether or not the keyboard can be displayed as the "keyboard type 26B". When it is determined at step SJ7 that the keyboard cannot be displayed as the "keyboard type 26B" (NO at step SJ7), it is judged at step SJ8 whether or not the keyboard can be displayed as the "keyboard type 26C". When it is determined at step SJ8 that the keyboard cannot be displayed as the "keyboard type 26C" (NO at step SJ8), it is judged at step SJ9 whether or not the keyboard can be displayed as the "keyboard type 26D". When it is determined at either of step SJ4, SJ5, SJ6, SJ7, SJ8 or SJ9 that the judged keyboard image is appropriate for the pitch range of music to be played, then such keyboard image is selected to be displayed at step SJ10.

Meanwhile, when it is determined at step SJ9 that the keyboard cannot be displayed as the "keyboard type 26D" (NO at step SJ9), that is, when the keyboard cannot be displayed as the 17 white-key keyboard or 26 white-key keyboard, the "keyboard type 61A" is selected at step SJ11. When it is determined at step SJ2 that music to be played is chord music (YES at step SJ2), the "keyboard type 17 Chord" is selected at step SJ12. When any one of keyboard images is selected, the keys are displayed in different color in the selected keyboard image at step SJ13, which keys fall within a pitch range other than the pitch range to be used. Then, operation returns to step SD7 in the guide process shown in FIG. 9.

Figure 18:
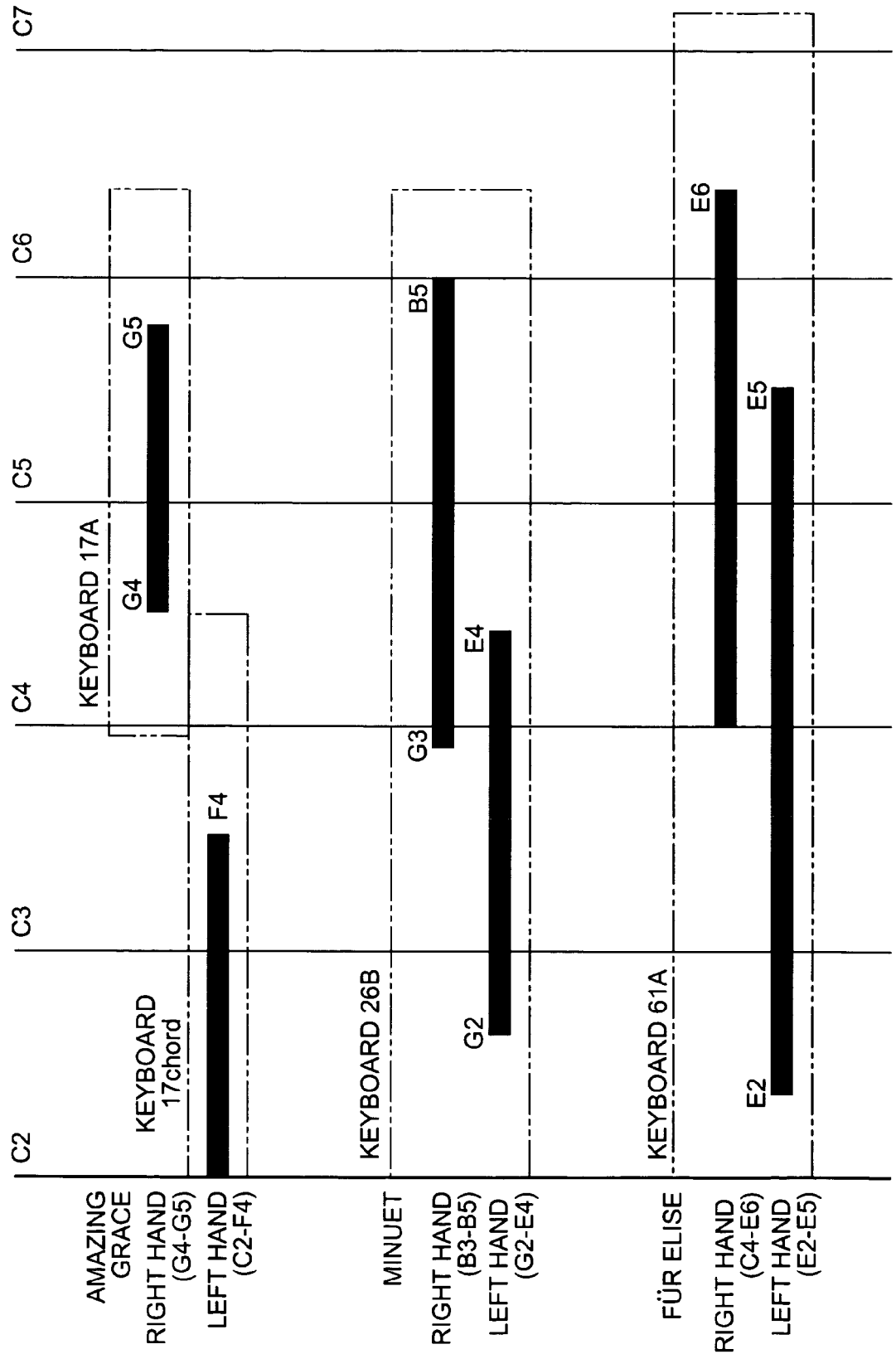
FIG. 18 is a view illustrating pitch ranges of three pieces of music to be played.

FIG. 18 is a view illustrating pitch ranges of three pieces of music such as "Amazing Grace", "Minuet" written by Bach, and "Für Elise".

In the case of "Amazing Grace", the pitch range in the part for right hand play is from G4 to G5, and the pitch range in the part for left hand play is from C2 to F4. Therefore, the part for right hand play can be displayed in the keyboard image of "keyboard type 17A" shown in FIG. 15A, and the part for left hand play can be displayed in the keyboard image of "keyboard type 17 Chord" shown in FIG. 15C.

In the case of "Minuet", the pitch range in the part for right hand play is from B3 to B5, and the pitch range in the part for left hand play is from G2 to E4. Therefore, the part for right hand play and the part for left hand play can be displayed in the keyboard image of "keyboard type 26B" shown in FIG. 16B.

In the case of "Für Elise", the pitch range in the part for right hand play is from C4 to E6, and the pitch range in the part for left hand play is from E2 to E5. Therefore, the part for right hand play and the part for left hand play can be displayed in the keyboard image of "keyboard type 61A" shown in FIG. 17.

After the keyboard displaying process has been executed at step SD7 in FIG. 9, the music search flag SONGF is reset to "0" at step SD8. Thereafter or when the music search flag SONGF has been set to "0" (NO at step SD2), a phrase guide process is executed at step SD9. In the phrase guide process, in each phrase previously set to include a bar or several bars, a key range necessary for playing the phrase and a key range unnecessary for playing the phrase are displayed in a different manner in the key range of the keyboard image displayed in the keyboard displaying process. Initially one bar is included in one phrase, but a player is allowed to set the number of bars in a phrase.

Figure 12:
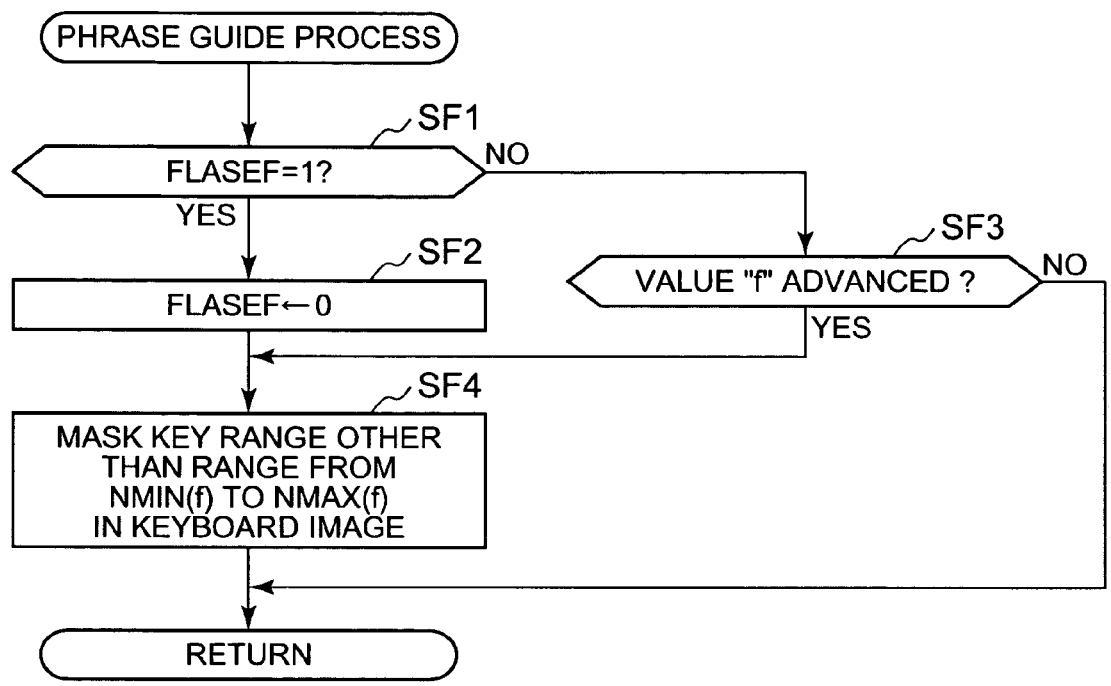
FIG. 12 is a flow chart of a phrase guide process in the guide process shown in FIG. 9.

FIG. 12 is a flow chart of a phrase guide process. At step SF1, it is judged whether or not a value "1" has been set to a flag FLASEF. When the flag FLASEF has been set to a value "0" (NO at step SF1), it is judged at step SF3 whether or not a value of the phrase number "f" has been advanced, that is, it is judged whether or not performance has moved to the following phrase. When the flag FLASEF has been set to a value "1" (YES at step SF1), music starts and the phrase number is "1". In this case, the flag FLASEF is reset to "0" at step SF2, and a portion of the displayed keyboard other than a portion from NMIN (f=1) to NMAX (f=1) is masked at step SF4. Further, even when the phrase number is advanced, a portion of the displayed keyboard other than a portion from NMIN (f≠1) to NMAX (f≠1) is masked at step SF4. That is, when music starts and a playing position is at the leading position of the phrase 1, and when performance has moved to the following phrase, a portion of the displayed keyboard other than a portion from NMIN(f) to NMAX(f) in the phrase "f" is masked.

Figure 19:
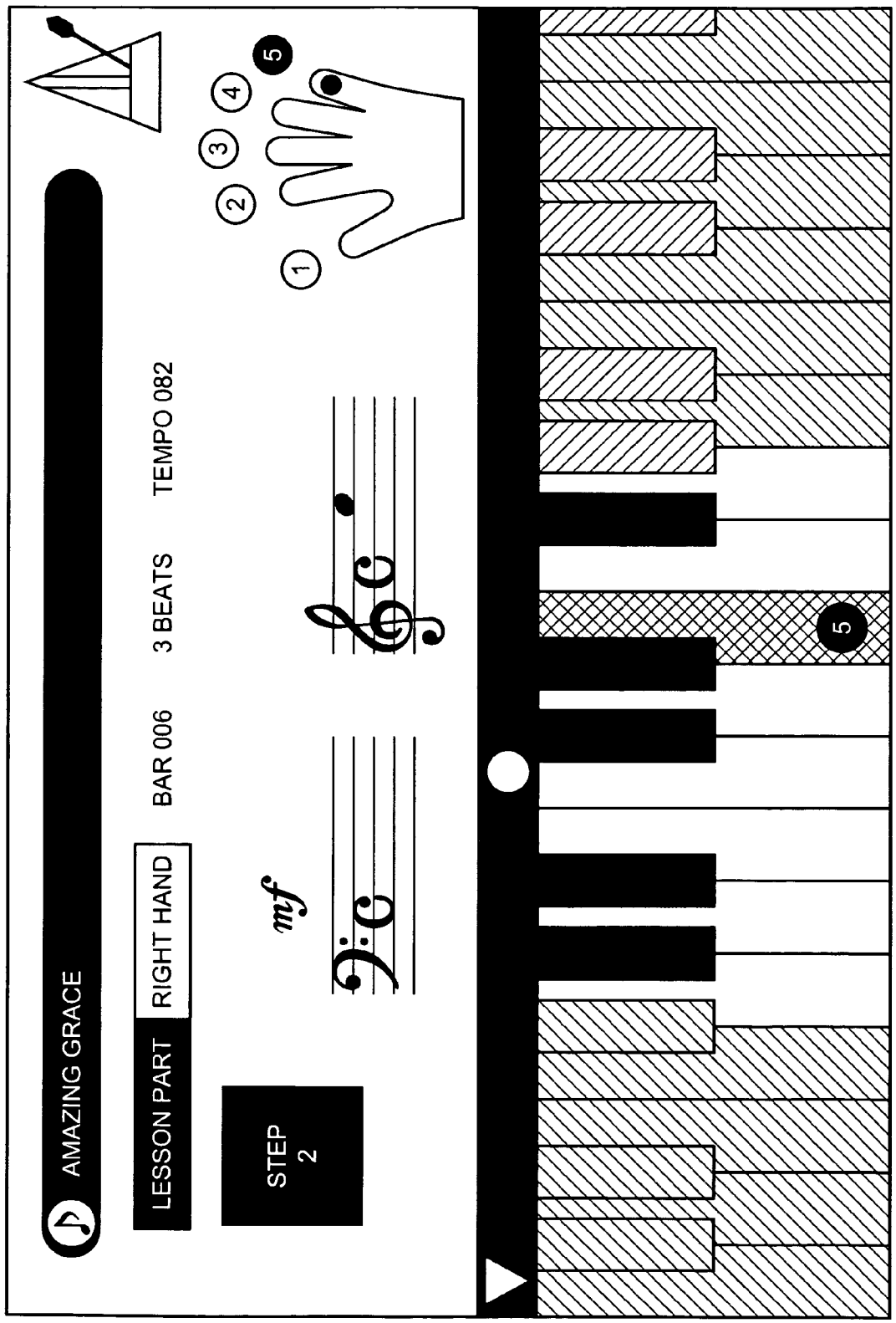
FIG. 19 is a view illustrating a keyboard image for right hand performance displayed on the display of the television receiver shown in FIG. 1.
Figure 20:
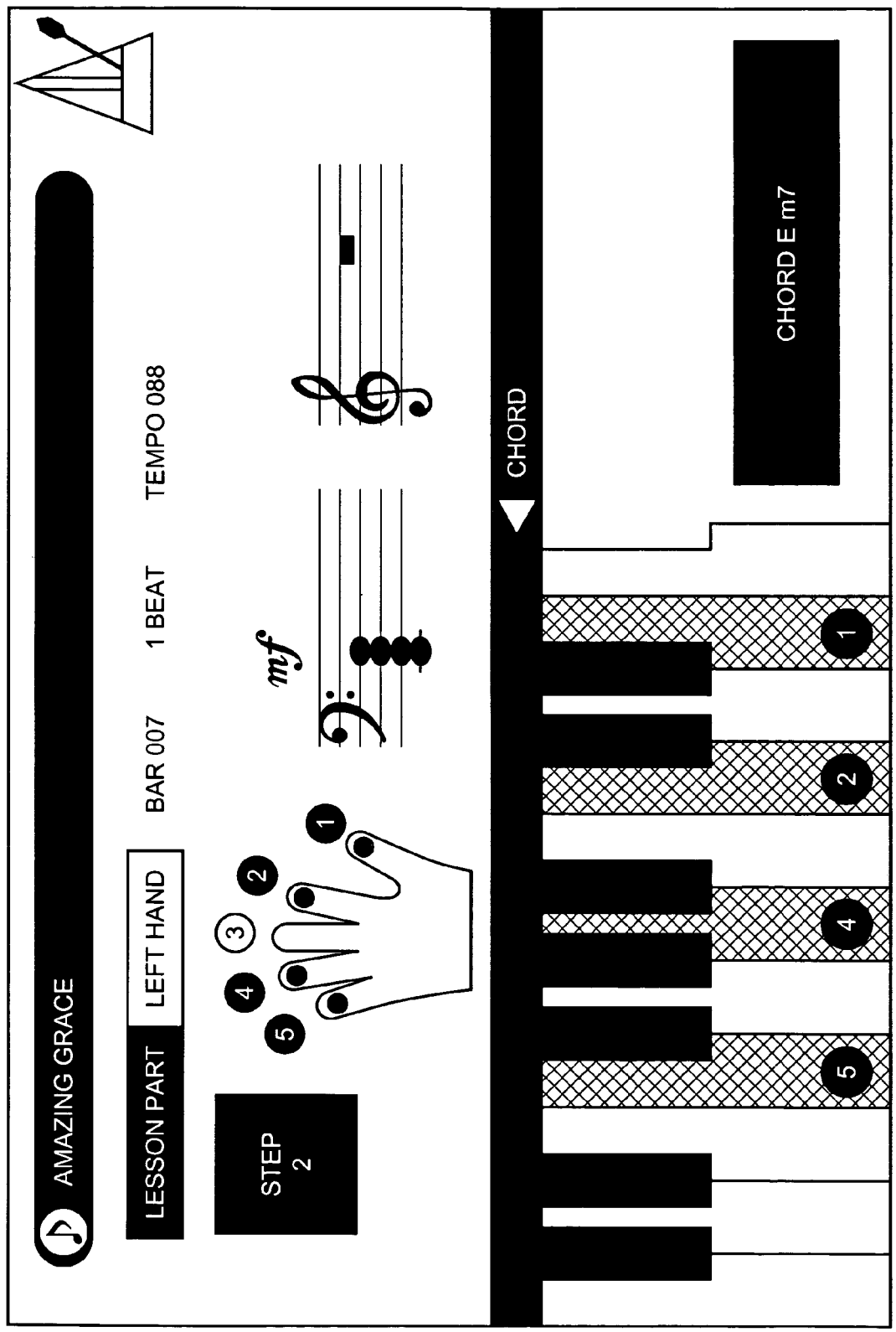
FIG. 20 is a view illustrating a keyboard image for left hand performance displayed on the display of the television receiver shown in FIG. 1.
Figure 21:
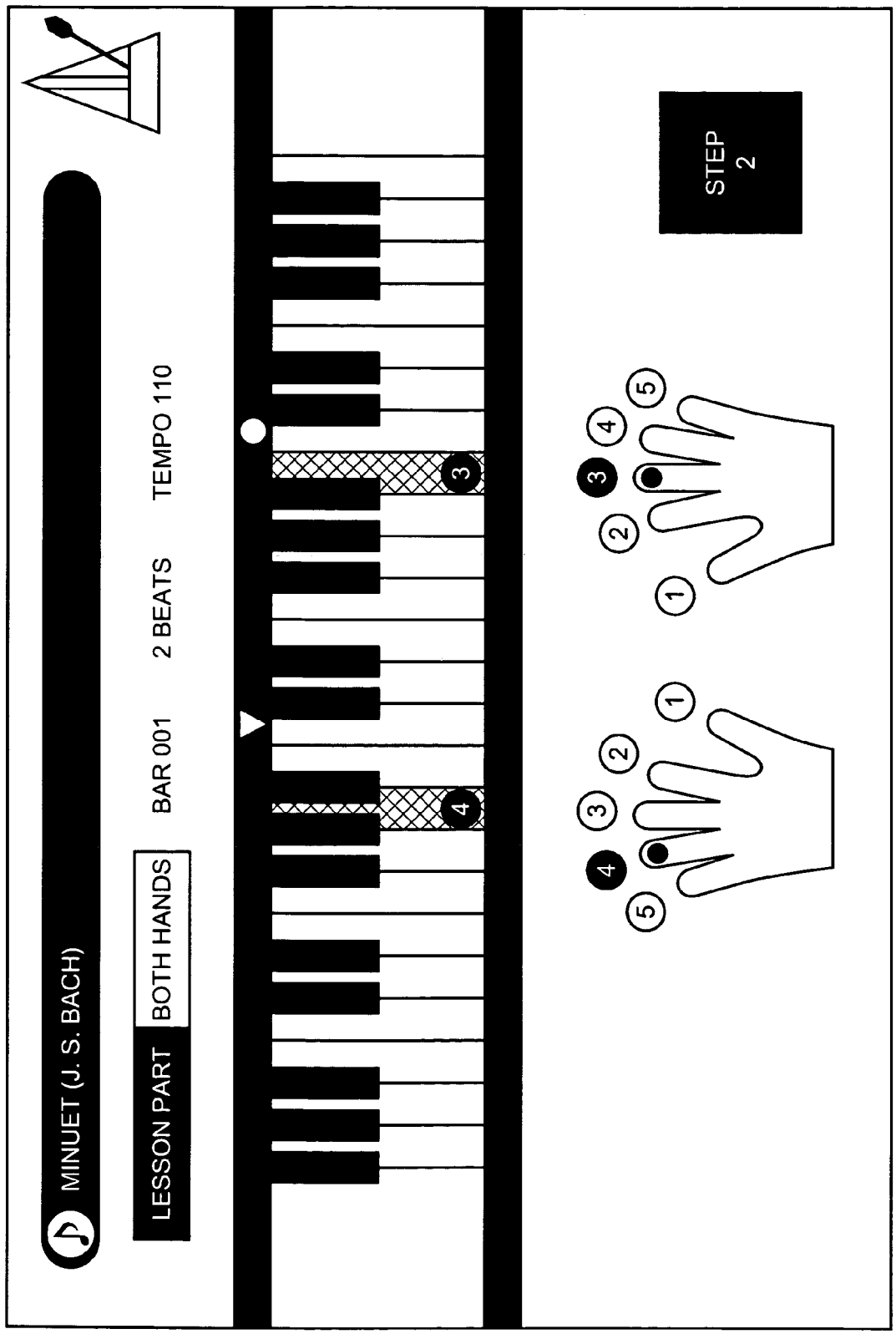
FIG. 21 is a view illustrating a keyboard image for both hands performance displayed on the display of the television receiver shown in FIG. 1.

The keyboard can be displayed in various manners. For example, in place of displaying the keyboard with some portion masked, keys of the keyboard are displayed in different manners, respectively. In FIG. 19, keys of the keyboard are displayed in different colors respectively. In FIGS. 20 and 21, keys in a key area which are not used for playing a phrase are masked in white or translucently. In FIGS. 19 to 21, a mark of "∇" and mark of "○" correspond respectively to the mark of "▼" M1 and mark of "●" M2 incused or printed on the upper side of the keyboard 1 shown in FIG. 1, and represent the positions of C4 key and C5 key, respectively. In other keyboard image to be describe below, a mark of "∇" represents a position of the key C4 and a mark of "○" represents a position of the key C5. In place of these marks incused or printed on the upper side of the keyboard 1, LEDs may be used, which are provided at substantially same positions as the marks, and turned on.

After the phrase guide process has been executed at step SD9 in FIG. 9, it is judged at step SD10 whether or not a value of "0" has been set to a sound generating flag ONF. When a value of "0" has been set to the sound generating flag ONF (sound ceasing) (YES at step SD10), data read out from the music memory 9 is time data following the note-off event. Therefore, time data is stored in a time register T. Then, it is judged at step SD11 whether or not the minimum unit of time (for example, a time duration which corresponds to a 96th note) has lapsed. When the minimum unit of time has not lapsed (NO at step SD11), operation returns to the main routine process. When the minimum unit of time has lapsed (YES at step SD11), the time register T is decremented at step SD12, and it is judged at step SD13 whether or not the time register T has reached "0". When it is determined at step SD13 that the time register T has not reached "0" (NO at step SD13), then operation returns to the main routine process.

Meanwhile, when a value of "1" has been set to the sound generating flag ONF (sound ceasing) (NO at step SD10), that is, when data read out from the music memory 9 is a note-off event, it is judged at step DS14 whether a register MODE has been set to a value "3" or to a value "1" or "2". MODE 3 represents a mode (self-advancing mode) in which music advances regardless of whether a key is played or not. MODE 1 represents a mode (any-key mode) in which music advances when any key is played. MODE 2 represents a mode (waiting mode) in which music does not advance until a correct key is played. When the register MODE has been set to a value "1" or "2" (YES at step SD14), it is judged at step SD15 whether or not a key-play flag KEYF has been set to a value "1" or it is judged whether any key has been played or not. When the key-play flag KEYF has been set to a value "0", operation returns to the main routine process. When the key-play flag KEYF has been set to a value "1", the key-play flag KEYF is rest to "0" at step SD16.

When it is determined at step SD13 that the time register T has reached "0" (YES at step SD13), or when it is determined at step SD14 that the register MODE has been set to "3" (NO at step SD14), or when it is determined at step SD16 that a value "0" has been set to the flag KEYF (YES at step DS16), it is judged at step SD17a in FIG. 10 whether or not an error flag ERRF( ) has been set a value "0". When it is determined at step SD17a that the error flag ERRF ( ) has been set a value "1" (NO at step SD17a), operation returns to the main routine process. When it is determined at step SD17a that the error flag ERRF ( ) has been set a value "0" (YES at step SD17a), the address of the register AD is incremented at step SD17b. The error flag ( ) will be described below. Then, it is judged at step SD18 whether or not music data is found at the incremented address. When music data is found at the incremented address (YES at step SD18), it is judged at step SD19 whether the phrase has advanced to the next phrase. When performance has advanced to the next phrase (YES at step SD19), the phrase number "f" is incremented at step SD20 and music data read out from the address AD of the music memory 9 is stored in the register DATA at step SD21.

It is judged at step SD22 whether or not music data stored in the register DATA is a note event or time data. When the music data is time data (NO at step SD22), the time data is stored in the time register T at step SD23, and then operation returns to the main routine process. Meanwhile, when the music data stored in the register DATA is a note event (YES at step SD22), a pitch of the note event is stored in a register NOTE at step SD24. Then, it is judged at step SD25 whether the note event is a note-on event or note-off event.

When the note event is a note-on event (YES at step SD25), LED for a key corresponding to the pitch stored in the register NOTE is made to turn on at step SD27. A note corresponding to such pitch is displayed on the display of the television receiver 200 at step SD27 and further a fingering guide is displayed on the display of the television receiver 200 at step SD28. A sound flag ONF is set to "1" at step SD29.

In the keyboard image illustrated in FIG. 19, a position indicating a key corresponding to a pitch E4 is displayed in a different color from others as shown in cross-hatching, and a finger number of a finger to be used to play the key (for example, "5") is displayed on a the key image. Further, an image of a right hand is displayed in the upper side to the keyboard image to give fingering guide, together with a note representing the pitch E4, as illustrated in FIG. 19. In the right hand image, the little finger to be used to play a key is attached with a mark "●" and a black circled number "5".

In the keyboard image illustrated in FIG. 20, keys corresponding to pitches C3, E3, G3 and B4 are displayed in different color to guide keys to be played, and finger numbers 1, 2, 4 and 5, which indicate thumb, index finger, annular finger and little finger of a left hand respectively, are displayed on appropriate key images. In the upper side to the keyboard image, an image of the left hand is displayed to give fingering guide, and further four notes of a chord part, representing pitches C3, E3, G3 and B4, are displayed. In the left hand image, its thumb, index finger, annular finger and little finger to be used to play keys are attached with marks "●" and black circled number "1", "2", "4" and "5" respectively.

In the keyboard image illustrated in FIG. 21, two key positions corresponding respectively to pitches A3 and A2 are displayed in different color from others to guide keys to be played, and a finger number 3 indicating the right middle finger and a finger number 4 indicating the left annular finger are displayed on appropriate key images. In the lower side of the keyboard image, a left hand image and right hand image are displayed for fingering guide. In the right hand image, the middle finger to be used to play a key is attached with a mark "●" and a black circled number "3". Similarly, in the left hand image, the annular finger to be used to play a key is attached with a mark "●" and a black circled number "4". In this case, notes are not displayed to display a larger image of the "keyboard type 61A".

Figure 22:
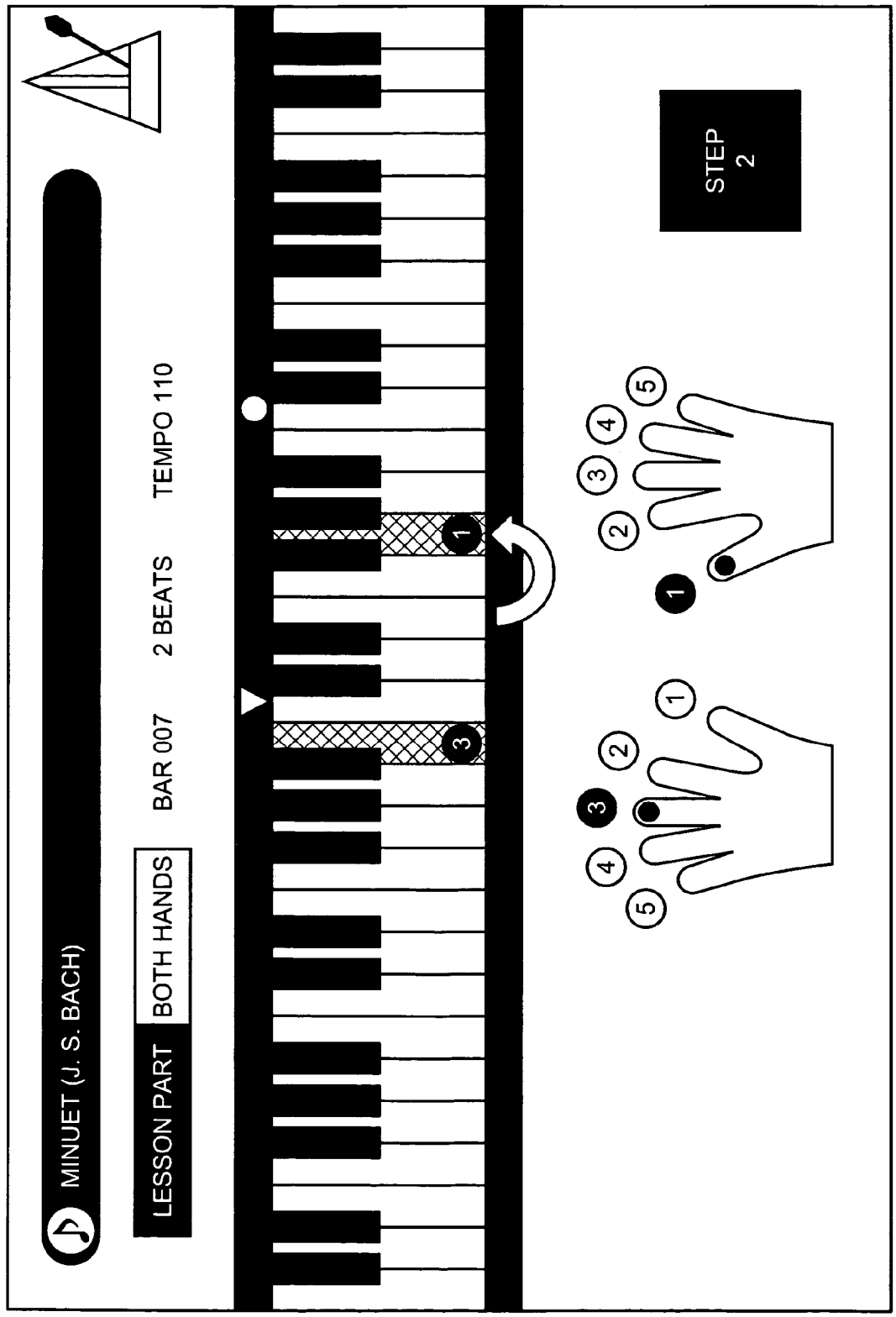
FIG. 22 is a view illustrating a keyboard image for finger crossing-under performance displayed on the display of the television receiver shown in FIG. 1.

In the keyboard image illustrated in FIG. 22, with respect to the left hand playing part, a key corresponding to a pitch B2 is displayed in different color from others to give fingering guide, and a finger number 3 indicating the left middle finger is displayed on the appropriate key image. In the lower side of the keyboard image, a left hand image is displayed to give fingering guide. Meanwhile, with respect to the right hand playing part, a key corresponding to a pitch G3 is displayed in different color from others to give fingering guide, and a finger number 1 indicating the right thumb is displayed on the appropriate key image. Further, in the lower side of the keyboard image, the right hand image is displayed to give fingering guide, and a curved arrow mark, which initially extends downward from the edged of the keyboard and then curves upward, is displayed. This arrow mark is displayed to give a cross fingering guide, which instructs to make thumb cross under another finger playing a key to play another key. Since a mark "●" and black circled number in the right hand and left hand image are similar to those in FIGS. 19 to 21, further description thereof will be omitted.

Figure 23:
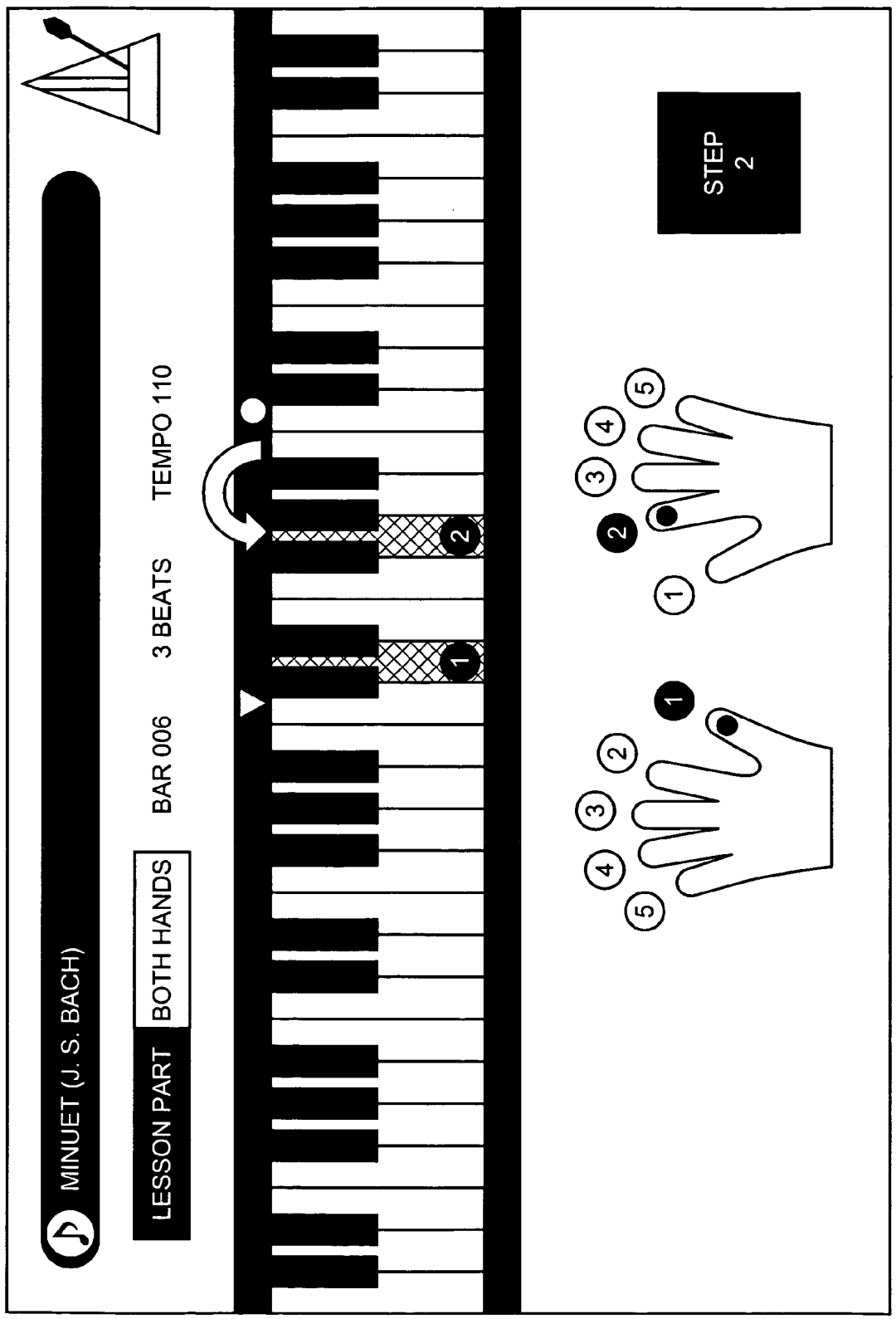
FIG. 23 is a view illustrating a keyboard image for finger crossing-over performance displayed on the display of the television receiver shown in FIG. 1.

In the keyboard image illustrated in FIG. 23, with respect to the left hand playing part, a key corresponding to a pitch D3 is displayed in different color from others to give fingering guide, and a finger number 1 indicating the left thumb is displayed on the appropriate key image. In the lower side of the keyboard image, a left hand image is displayed to give fingering guide. Meanwhile, with respect to the right hand playing part, a key corresponding to a pitch F3 is displayed in different color from others to give fingering guidance, and a finger number 2 indicating the right index finger is displayed on the appropriate key image. Further, in the lower side of the keyboard image, the right hand image is displayed to give fingering guide, and a curved arrow mark, which initially extends upward from the top edge of the keyboard and then curves downward, is displayed. This arrow mark is display to give a cross fingering guide, which instructs to make the index finger cross over thumb another finger playing a key to play another key.

After the flag ONF has been set to a value of "1" at step SD29, operation returns to step SD14 in FIG. 9, where it is judged whether the register MODE has been set to a value "3" or to a value "1" or "2". MODE 3 represents a mode (self-advancing mode) in which music advances regardless of whether a key is played or not. MODE 1 represents a mode (any-key mode) in which music advances when any key is played. MODE 2 represents a mode (waiting mode) in which music does not advance until a correct key is played. When the register MODE has been set to a value "1" or "2" (YES at step SD14), it is judged at step SD15 whether or not the key-play flag KEYF has been set to a value "1". When the key-play flag KEYF has been set to a value "0" (NO at step SD15), operation returns to the main routine process. When the key-play flag KEYF has been set to a value "1" (YES at step SD15), the key-play flag KEYF is rest to "0" at step SD16. When the register MODE has been set to a value "3", or when the register MODE has been set to a value "1" or "2" and the flag KEYF is set to "1" (a key has been played), operation advances to step SD17a to read out the following music data.

When the read out music data is a note event, and when it is determined at step SD25 in FIG. 10 that the note event is a note-off event (NO at step SD25), LED for a key corresponding to the value of the register NOTE is turned off at step SD30. The image of the note and an image of fingering guide are deleted on the display of the television receiver 200 respectively at step SD31 and step SD32. Then, the flag ONF is reset to "0" at step SD33. Thereafter, operation returns to step SD17a, where the following music data is read out.

When no music data has been found at step SD18 (NO at step SD18), that is, when data designated by the address register AD is END and music has come to the end, the flag STF is rest to "0" at step SD34, and all the LEDs are turned off at step SD35. The images on the display of the television receiver 200 are cleared at step SD36, and then operation returns to the main routine process shown in FIG. 4.

Figure 13:
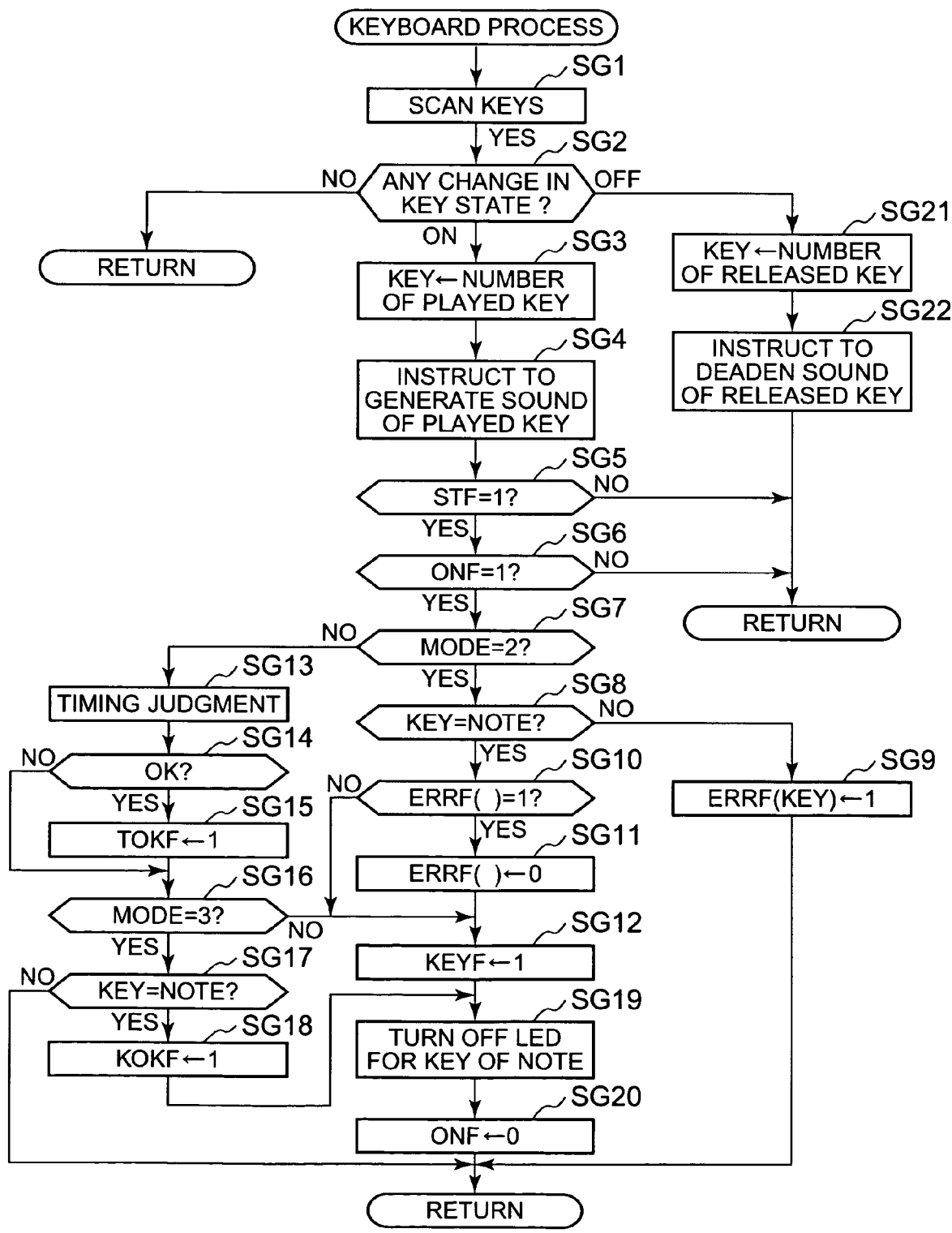
FIG. 13 is a flow chart of a keyboard process in the main routine process shown in FIG. 4.

FIG. 13 is a flow chart of the keyboard process at step SA4 in the main routine process. The keyboard 1 is scanned at step SG1 to judge whether or not any change has occurred in a key state of the keyboard 1 at step SG2. When no change has occurred in the key state of the keyboard 1 (NO at step SG2), operation returns to the main routine process. When it is determined that the key state of the keyboard 1 has changed from "off" to "on", that is, when a key has been played, the number of the played key is registered in a register KEY at step SG3, and CPU 5 instructs the sound source unit 10 to generate a sound corresponding to the pitch designated by the register KEY at step SG4. Then, it is judged at step SG5 whether or not the flag STF has been set to "1". When the flag STF has been set to "1" (YES at step SG5), it is judged at step SG6 whether or not the flag ONF has been set to "1".

When the flag STF has been set to "0" (NO at step SG5), or when the flag ONF has been set to "0" (NO at step SG6), operation returns to the main routine process. When the flag ONF has been set to "1" (YES at step SG6), it is judged at step SG7 whether or not the register MODE has been set to "2" (waiting mode). When the register MODE has been set to "2" (YES at step SF7), it is judged at step SF8 whether or not the key number of the register KEY coincides with the pitch of the note-on event stored in the register NOTE. When the key number of the register KEY does not coincide with the pitch of the note-on event stored in the register NOTE (NO at step SG8), or when a wrong key has been played, the error flag ERRF (KEY) corresponding to the key number is set to "1" at step SG9, and then operation returns to the main routine process. In this case, the following music data is not read out in the guide process in FIG. 10 until a value of "0" is set to the error flag ERRF( ) at step SD17a.

When the key number of the register KEY coincides with the pitch of the note-on event stored in the register NOTE (YES at step SG8 in FIG. 13), that is, when a correct key has been played, it is judged at step SG10 whether a wrong key was previously played to set "1" to the error flag ERRF( ) or not. When the error flag ERRF( ) was set to "1" (YES at step SG10), the error flag ERRF( ) is reset to "0" at step SG11. When the error flag ERRF( ) was set to "0" (NO at step SG10), or when the error flag ERRF( ) is reset to "0" at step SG11, the key-play flag KEYF is set to "1" at step SG12.

When it is determined at step SG7 that the register MODE has been set to "1" (any-key mode) or "3" ("self advancing mode") (NO at step SG7), a timing of playing a key is judged at step SG13, and it is judged at step SG14 whether or not a key has been played at a correct timing. When the key has been played at a correct timing (YES at step SG14), a value of "1" is set to a flag TOKF at step SG15. Then, it is judged at step SG16 whether the register MODE has been set to "3" or "1". When the register MODE has been set to "1" (NO at step SG16), the key-play flag KEYF is set to "1" at step SG12. When the register MODE has been set to "3" (YES at step SG16), it is judged at step SG17 whether or not the key number stored in the register KEY coincides with the pitch of the note-on event stored in the register NOTE. When a correct key has been played and the key number coincides with the pitch (YES at step SG17), the flag TOKF is set to "1" at step SG18. When a correct key has not been played and the key number does not coincide with the pitch (NO at step SG17), operation returns to the main routine process.

After the process of step SG18 has been executed, or when "1" has been set to the key-play flag KEYF, that is, when the register MODE has been set to "1", "2" or "3", LED for a key corresponding to the value of the register NOTE is turned off at step SG19 while conditions under which music advances are satisfied, and the flag ONF is reset to "0" at step SG20. Thereafter, operation returns to the main routine process, and moves to a process for reading out the following music data.

When it is determined at step SG2 that a key state has been changed from "on" to "off", that is, when a key has been released, the key number of the released key is stored in the register KEY at step SG21, and CPU 5 instructs the sound source 10 to cease a sound corresponding to the key number stored in the register KEY at step SG22, and returns to the main routine process.

Figure 14:
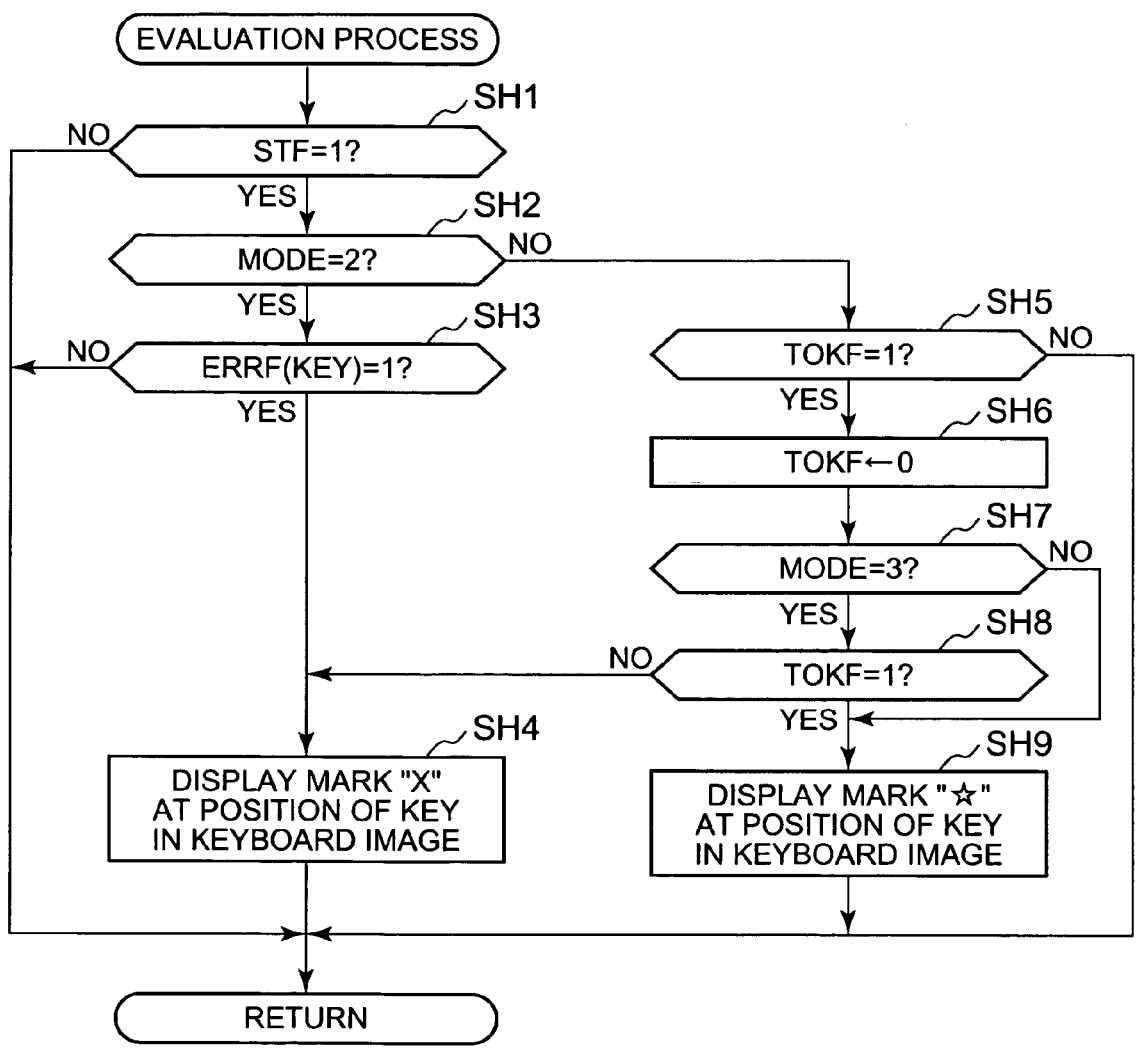
FIG. 14 is a flow chart of an evaluation process in the main routine process shown in FIG. 4.

FIG. 14 is a flow chart of the evaluation process at step SA5 in the main routine process. It is judged at step SH1 whether or not the flag STF has been set to "1". When the flag STF has been set to "0" (NO at step SH1), operation returns to the main routine process. When the flag STF has been set to "1" (YES at step SH1), it is judged at step SH2 whether or not the register MODE has been set to "2". When the register MODE has been set to "2" (YES at step SH2), it is judged at step SH3 whether or not "1" has been set to the flag ERRF (KEY). When "0" has been set to the flag ERRF (KEY) (NO at step SH3), operation returns to the main routine process. When "1" has been set to the flag ERRF (KEY) (YES at step SH3), an incorrect mark "X" is displayed at a position in the keyboard image corresponding to the value of the register KEY at step SH4. More specifically, when a different key from the key which the fingering guide instructs to play is played in the waiting mode, the incorrect mark "X" is displayed at the position in the keyboard image corresponding to the played key at step SH4.

When the register has been set to "1" or "3" (NO at step SH2), it is judged at step SH5 whether or not "1" has been set to the flag TOKF, that is, it is judged whether or not a key has been played at a correct timing. When "0" has been set to the flag TOKF (NO at step SH5), operation returns to the main routine process. When "1" has been set to the flag TOKF (YES at step SH5), the flag TOKF is reset to "0" at step SH6, and it is judged at step SH7 whether or not the register MODE has been set to "3". When the register MODE has been set to "3" (YES at step SH7), it is judged at step SH8 whether or not "1" has been set to the flag KOKF (correct key played). When "0" has been set to the flag KOKF (incorrect key played) (NO at step SH8), the incorrect mark "X" is displayed at the position in the keyboard image corresponding to the played key at step SH4. When "1" has been set to the flag KOKF (correct key played) (YES at step SH8), or when "1" the register MODE has been set to "1" (NO at step SH7), the correct mark "☆" is displayed at the position in the keyboard image corresponding to the played key at step SH9.

After the correct mark "☆" or incorrect mark "X" has been displayed at the appropriate position in the keyboard image, operation returns to the main routine process.

Figure 24A:
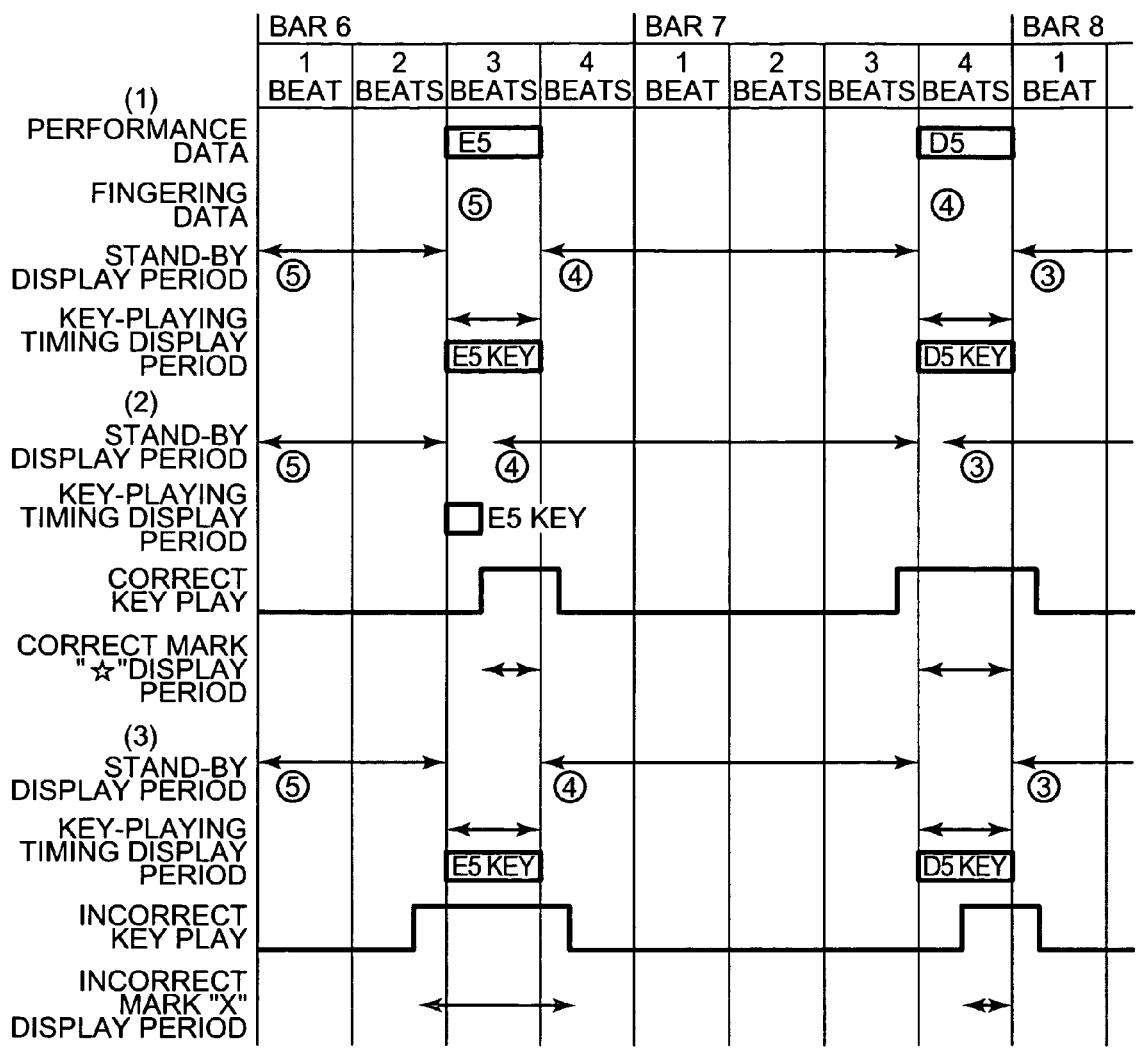
FIGS. 24A and 24B are charts indicating changes in guide and a key state in accordance with music data.
Figure 24B:
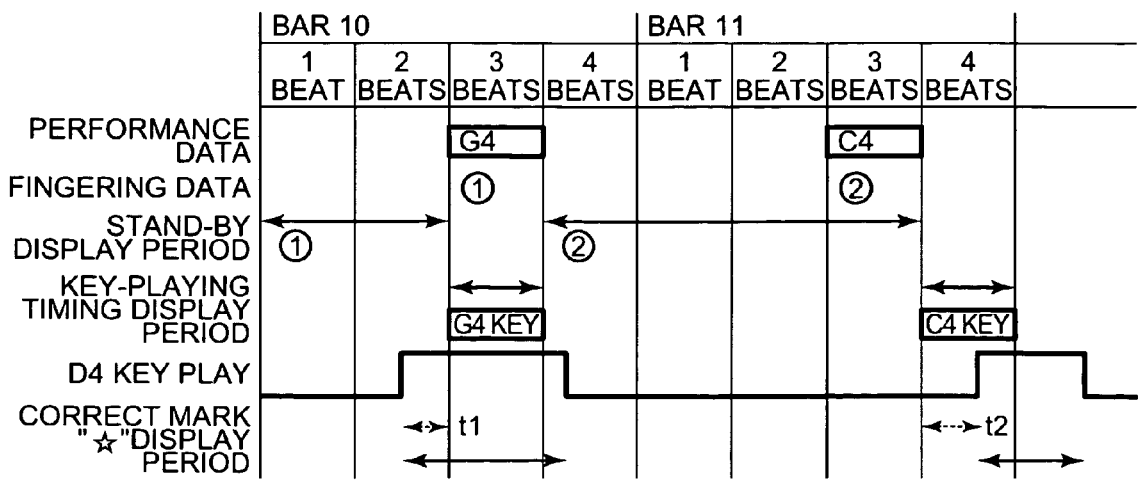

FIGS. 24A and 24B are timing charts illustrating transitions of performance guide, key state, and evaluation with respect to music data. FIGS. 25 to 30 are views illustrating changes in the keyboard image displayed on the television receiver 200.

As illustrated at (1) in FIG. 24A, in the case of music data instructing to play a key of E5 with a little finger (finger number: 5) at the third beat in sixth bar, a fingering guide is given by displaying the finger number "5" at the key position corresponding to E5 in the keyboard image during a stand-by display period between the first and second beat in the sixth bar. In a key-playing timing display period, the key position corresponding to E5 in the keyboard image is designated. In the case of music data instructing to play a key of D5 with an annular finger (finger number: 4) at the fourth beat in seventh bar, fingering guide is given by displaying the finger number "4" at the key position corresponding to D5 in the keyboard image during the stand-by display period between the fourth beat in sixth bar and third beat in the seventh bar. In the key-playing timing display period, the key position corresponding to D5 in the keyboard image is designated.

Figure 25:
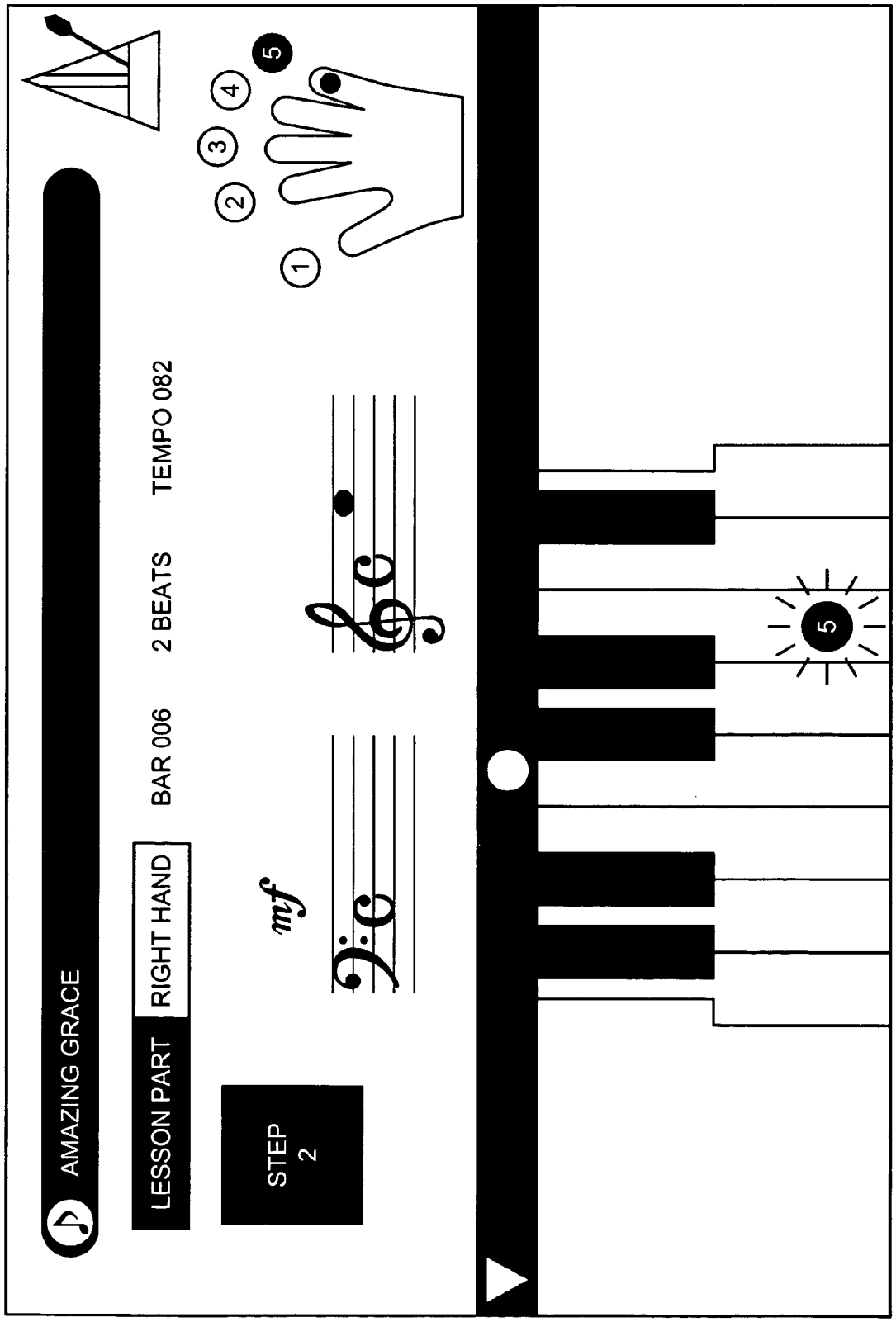
FIG. 25 is a view illustrating a keyboard image displayed on the display of the television receiver shown in FIG. 1 during a stand-by display period in right hand performance.
Figure 26:
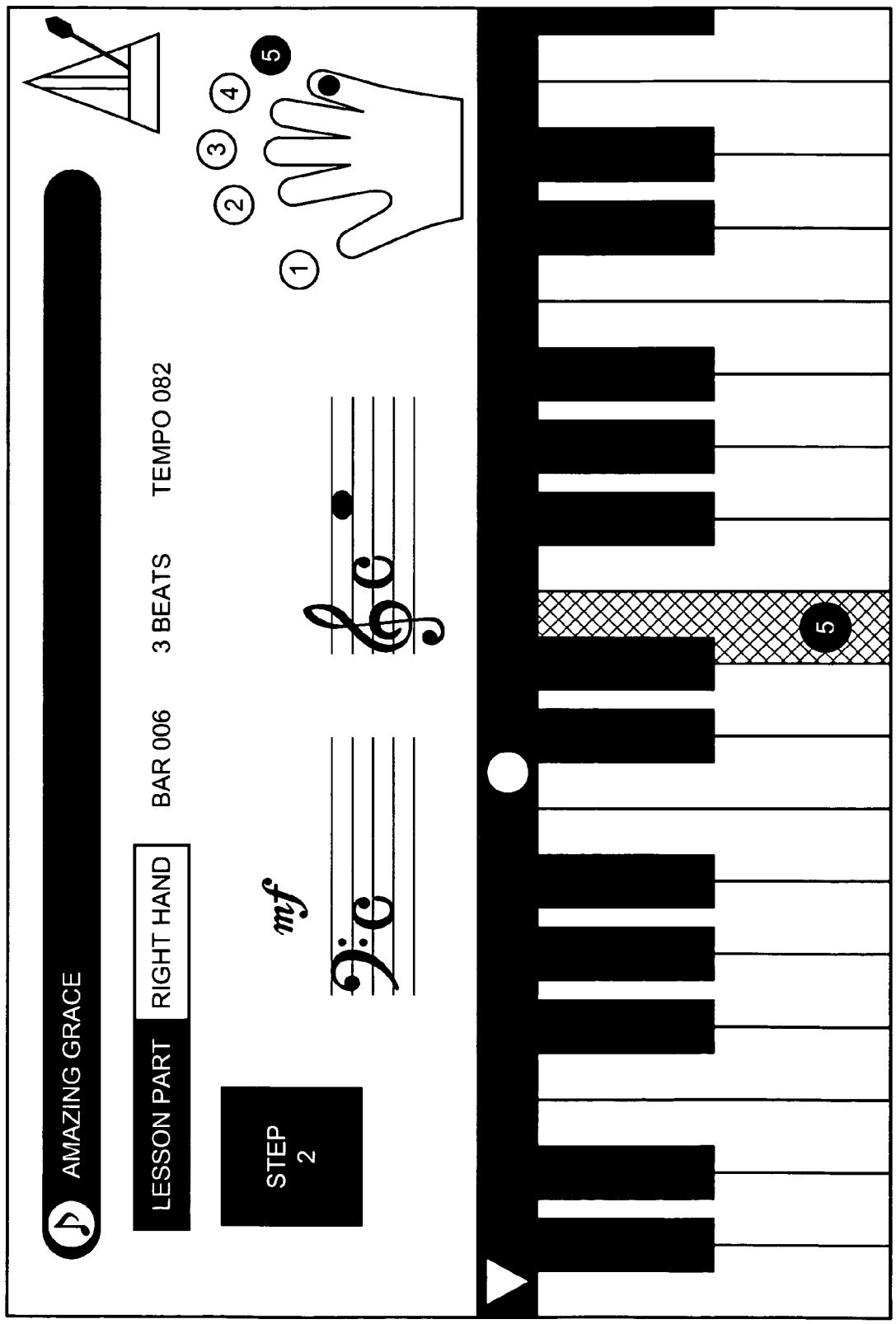
FIG. 26 is a view illustrating a keyboard image displayed on the display of the television receiver of FIG. 1 at a key playing timing in right hand performance.
Figure 27:
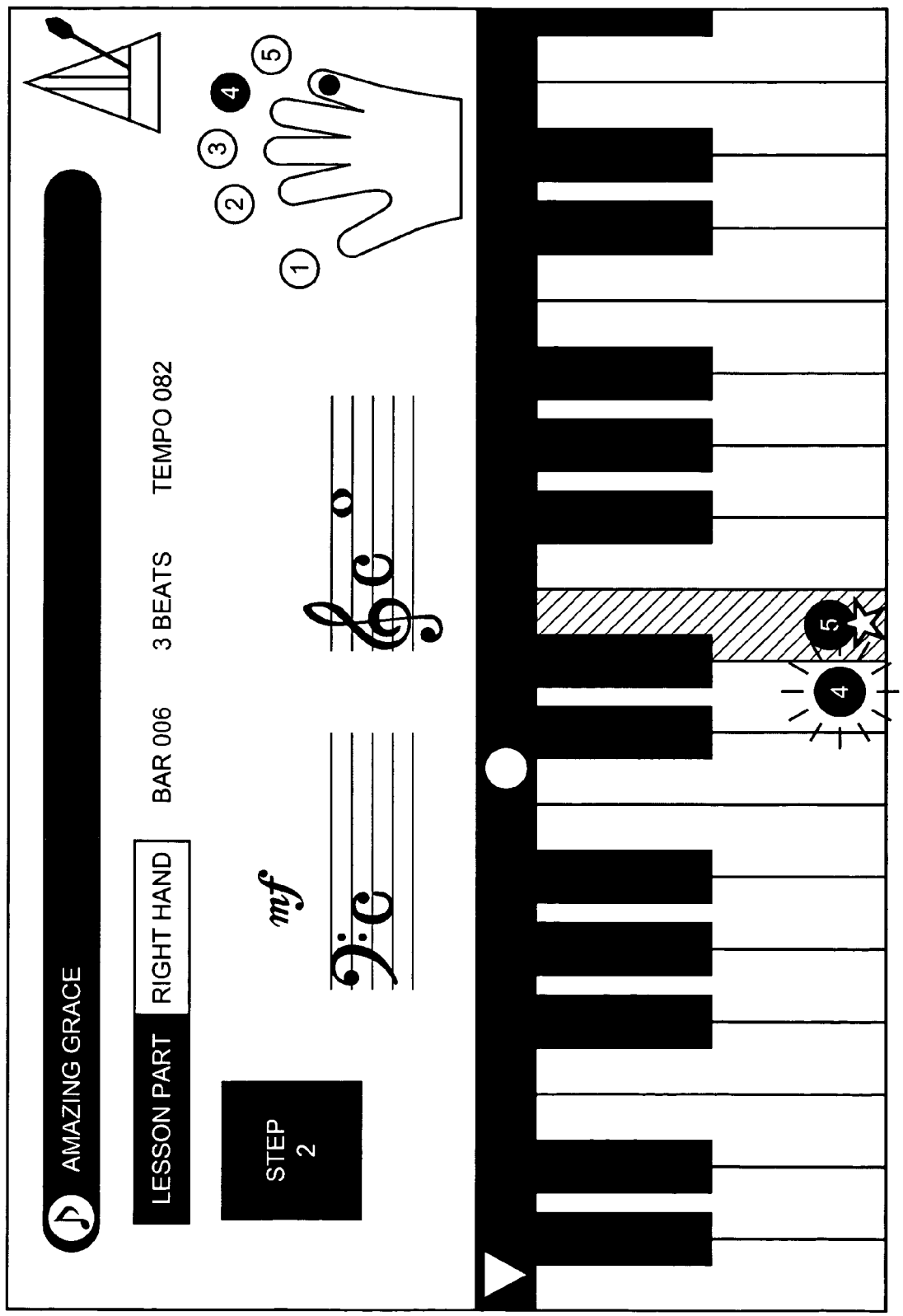
FIG. 27 is a view illustrating a keyboard image displayed on the display of the television receiver of FIG. 1, which image shows evaluation made when a correct key has been played in right hand performance.
Figure 28:
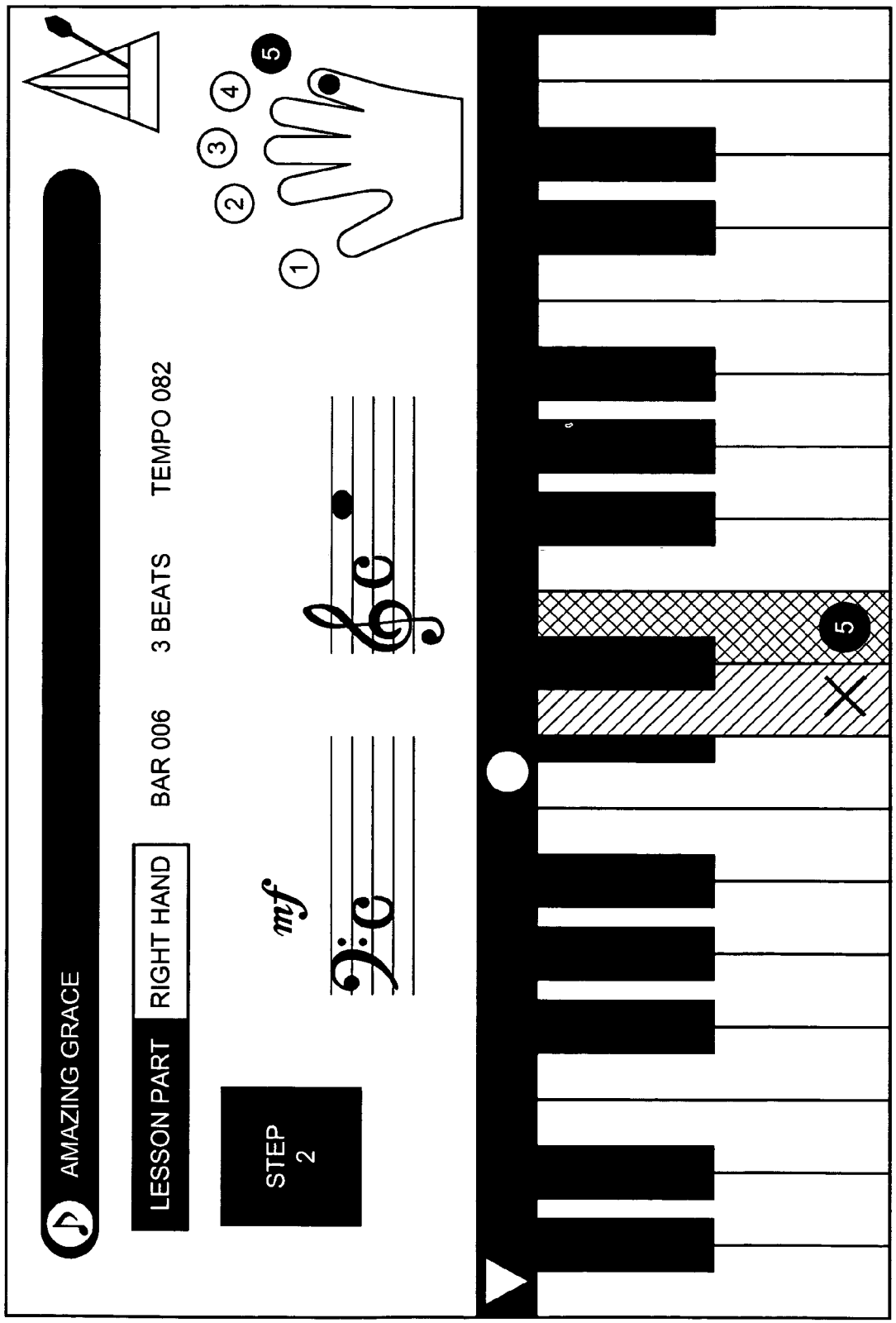
FIG. 28 is a view illustrating a keyboard image displayed on the display of the television receiver of FIG. 1, which image shows evaluation made when an incorrect key has been played in right hand performance.

When the above fingering guide has been given, and further when a correct key has been played, a timing of key playing is shown at (2) in FIG. 24A, and keyboard images are displayed as illustrated in FIGS. 25 to 27. A key-play performance during which a key is kept played is represented by a pulse of a high level, as illustrated at (2) in FIG. 24A. During the stand-by display period between the first beat and second beat in the sixth bar, the finger number of little finger "5" is blinking at the key position corresponding to E5 in the keyboard image. And the hand image is displayed in the top of the keyboard image to give fingering guide. During the key-playing timing display period, color for displaying the key position corresponding to E5 in the keyboard image changes as illustrated in cross hatching in FIG. 26 with the finger number "5" displayed on the key position. When the key of E5 is played at the third beat, color for displaying the key position corresponding to E5 in the keyboard image changes as illustrated by cross hatching in FIG. 27, and the correct mark "☆" is displayed on the key position of E5 in the keyboard image. Further, the finger number of annular finger "4" blinks at the key position corresponding to a key D5 to be played next, and a new hand image is displayed at the top of the keyboard image to give fingering guide. In the new hand image, the mark "●" on the little finger indicates the finger which is used to play a key, and the black circled number "4" indicates that a finger which is to be used next to play a key is an annular finger.

Meanwhile, when the above fingering guide has been given, and further when an incorrect key has been played, a timing of key playing is shown at (3) in FIG. 24A. In this case, when a key of D5 is played in place of a key of E5, the finger number of "5" is displayed at a key position corresponding to a key E5 to be played in the keyboard image, and color for displaying such key position shown by cross hatching in FIG. 8 changes, and color for displaying the key position corresponding to the key D5 which has been played in error changes as indicated by cross hatching in the keyboard image shown in FIG. 8, and an incorrect mark "X" is displayed on the key position.

Figure 29:
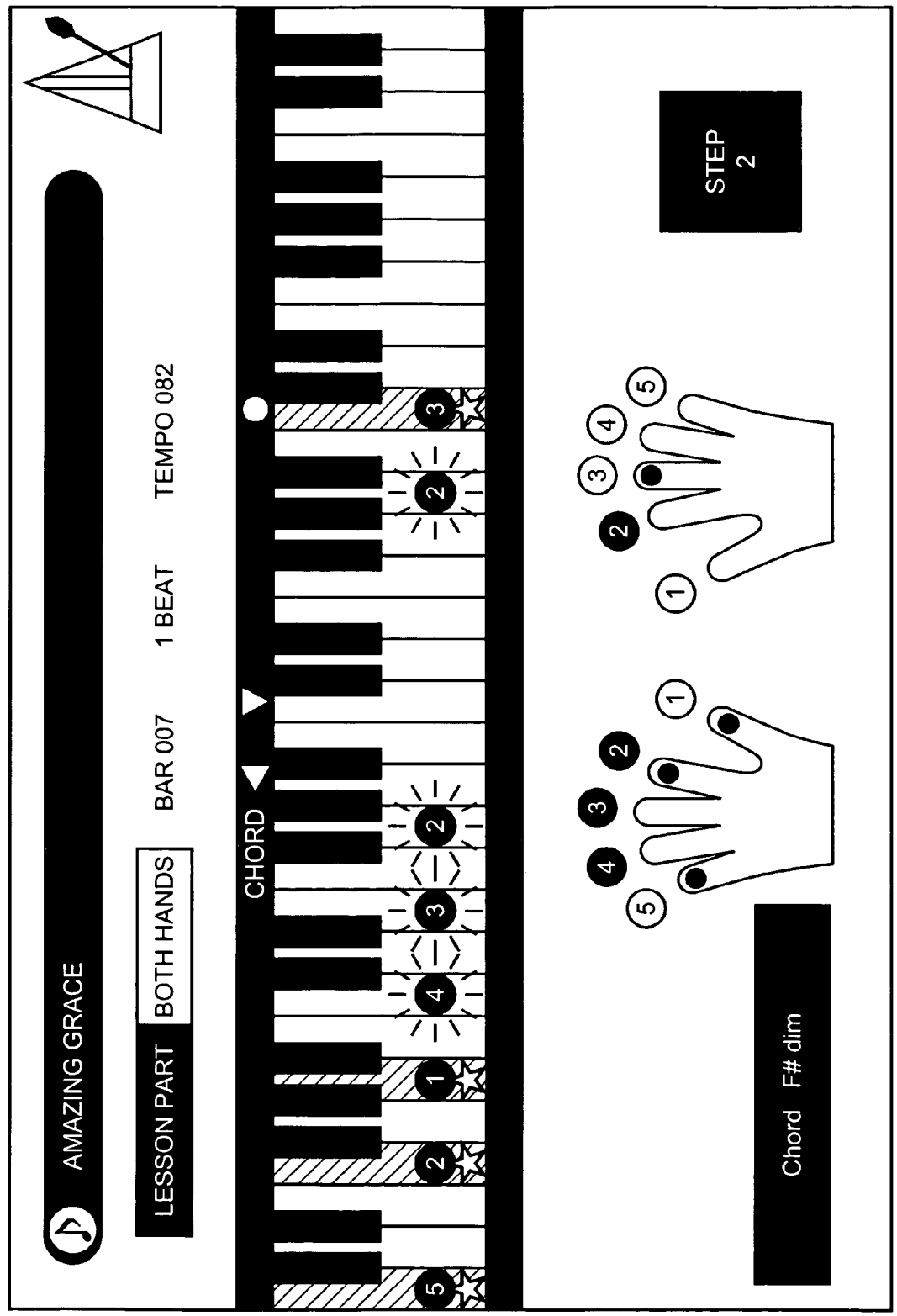
FIG. 29 is a view illustrating a keyboard image displayed on the display of the television receiver of FIG. 1, which image shows evaluation made when correct keys have been played in both hands performance.

FIG. 29 is a view illustrating a keyboard image indicating a result of both hands performance. Fingering guide is given that instructs to play a key of C5 with the right hand and to play a chord of "F# dim" consisting of keys C2, F2 and A2 with the left hand. The view of FIG. 29 illustrates a keyboard image generated when keys have been played correctly. Color for displaying key positions corresponding to played keys changes as illustrated by hatching in the keyboard image, and the correct marks "☆" are displayed on such key images. Further, the finger numbers are blinking on the key positions corresponding to keys to be played next. Black marks "●" are displayed on the images of fingers used to play keys, and black circled finger numbers are displayed in the vicinity of the images of fingers to be used to play keys next.

Figure 30:
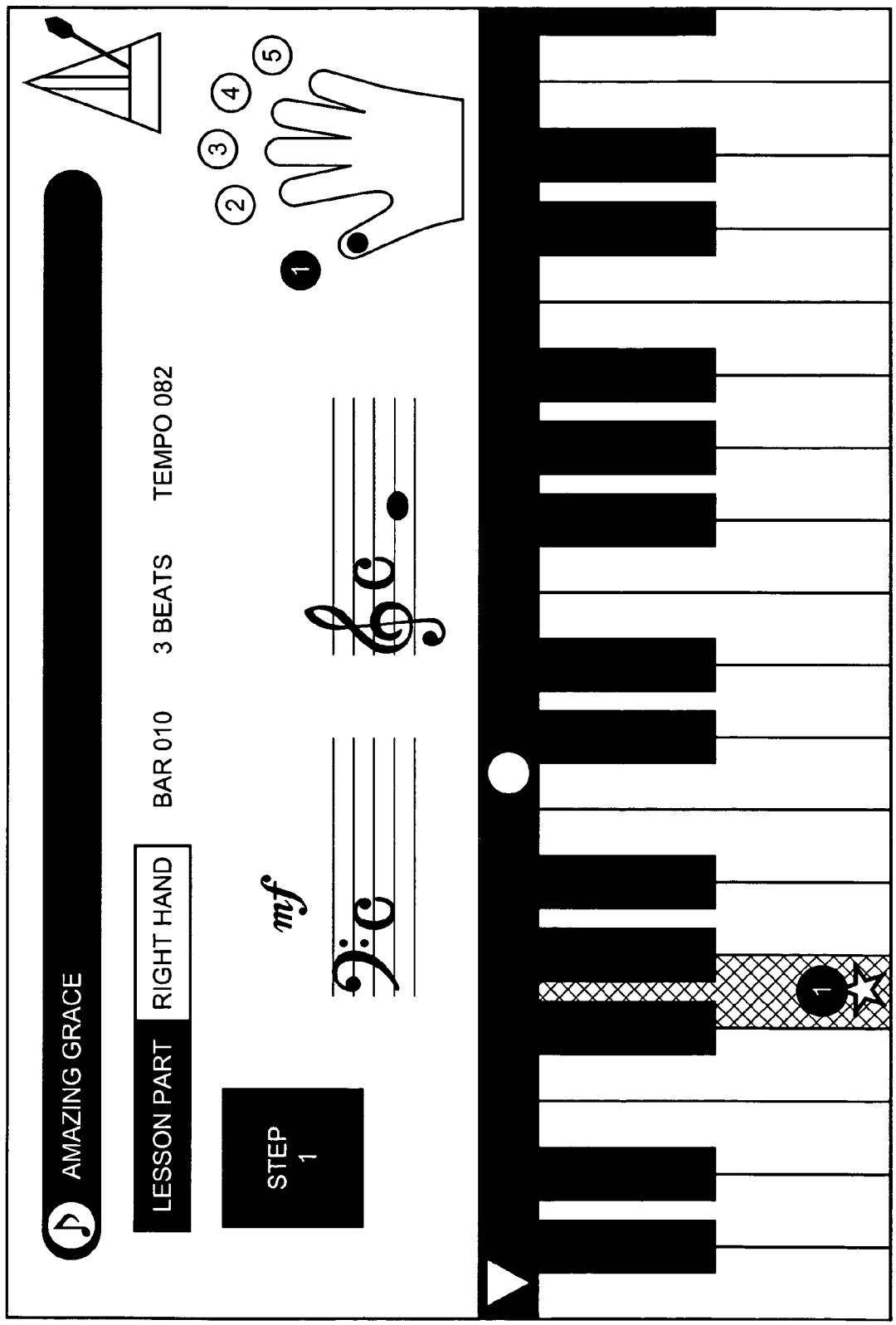
FIG. 30 is a view illustrating a keyboard image displayed on the display of the television receiver of FIG. 1, which image shows evaluation made when a key has been played at a correct timing.

FIG. 24B is a timing chart illustrating changes in performance guide, key state, and evaluation with respect to music data given when the register mode has been set to "1" ("any key mode"). In FIG. 24B, performance guide that instructs to play a key of G4 with the little finger (finger number "1") is given during the stand-by display period. During the key-playing timing display period is given performance guide that indicates a key position corresponding to G4 by changing color of such key position. In this case, the timing chart shows that the key of D4 was played earlier than the correct key playing timing by "t1". In the timing judgment at step SG13 in FIG. 13, it is determined that the key has been played at the correct timing, when the time of "t1" falls in an allowable range. In this case, the correct mark "☆" is displayed on the key position corresponding to G4 in the keyboard image, as shown in FIG. 30.

Since the "any-key mode" is for a just beginners' lesson, the incorrect mark "X" is not displayed, even though the key of C4 which is to be played at the fourth beat in the eleventh bar is played late by "t2" and the time of "t2" does not fall in the allowable range, determining that an incorrect key has been played.

As described above, in the embodiment of the electronic musical instrument 100 according to the present invention, the pitch range of music to be played is searched, and the keyboard image is generated based on the marks "▼" and "●" provided on the keyboard, and the searched pitch range. The marks "▼" and "●" are prepared to indicate key positions corresponding to the reference pitches C4 and C5. The keyboard image is sent to and displayed on the television receiver 200.

Therefore, the relative relationship between the position of key to be played and the key position designated in the keyboard image can be easily learned.

The keyboard image is generated, which includes the minimum number of keys necessary for displaying the searched pitch range, and particular images locating at positions corresponding to C4 (mark M1 "▼") and C5 (mark M2 "●") of the keyboard 1, that is, images "V" at C4 position and "○" at C5 position. Therefore, the keyboard image can be displayed as large as possible within the limited display area, and the relative relationship between the position on the keyboard 1 and the keyboard image can easily be confirmed based on the marks indicated on the keyboard 1 and the corresponding images.

In the keyboard image generated based on the searched pitch range, since the key range to be played and the key range not to be played are displayed in different color, the relative relationship between the key position on the keyboard of the musical instrument and the keyboard image can intuitively be confirmed.

In the case where the key range to be played and the key range not to be played are displayed in different color, since the range corresponding to a part to be played among plural parts of music and the range corresponding to a part not to be played are displayed in different color, a beginner player can concentrate to the part to play.

In the case where the key range to be played and the key range not to be played are displayed in different color, since the range corresponding to a phrase of music which is now being played and the range corresponding to other phrase of music are displayed in different color, even a beginner player can smoothly play music.

Since the generated keyboard image includes fingering guide, even a beginner player can smoothly play music.

Since performance is judged which is executed on the keyboard image displayed on the display of the television receiver 200 in accordance with a guide image, a performance executed in error can easily be recognized.

In the keyboard image, parts corresponding to plural parts of music are displayed in different colors, for example, in red or in green, the part to be played on the keyboard 1 can intuitively be confirmed.

Figure 31:
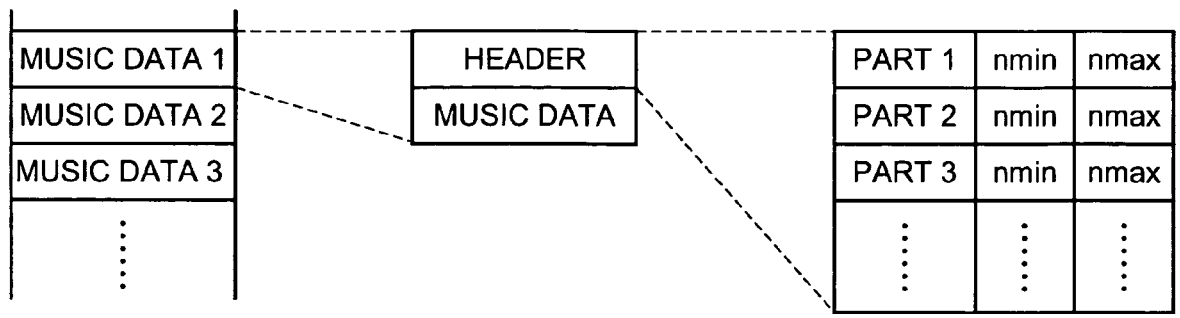
FIG. 31 is a view illustrating a structure of music data in a modified embodiment.
Figure 32:
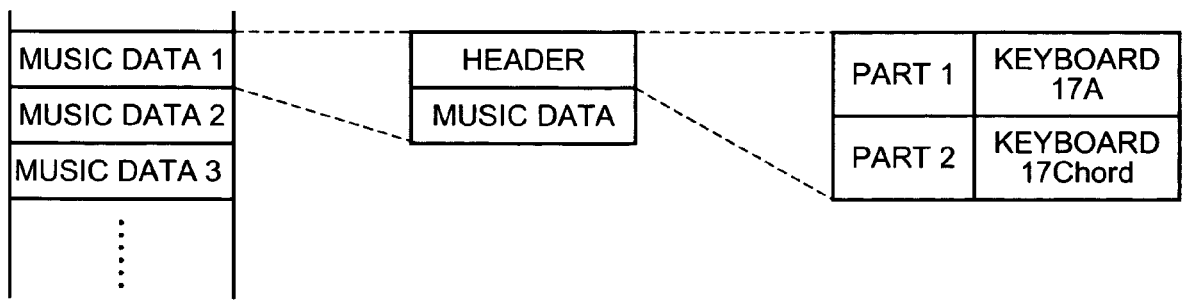
FIG. 32 is a view illustrating a structure of music data in another modified embodiment.

In the embodiment of the electronic musical instrument of the present invention, the pitch range of music data to be played is searched in the music search process shown in FIGS. 7 and 8. But modification may be made to the electronic musical instrument, such that the musical data previously includes data indicating a pitch range of music or data indicating the types of appropriate keyboard images. FIGS. 31 and 32 are views illustrating structures of music data used in the modified embodiments of the electronic musical instrument.

In each piece of music data illustrated in FIG. 31, the header includes the lowest pitch "nmin" and highest pitch "nmax" in each part. Therefore, CPU 5 reads out the pitch data of the music from the header of the music data before starting performance, and can select an appropriate keyboard type.

In each piece of music data illustrated in FIG. 32, the header includes data indicating the type of a keyboard which is proper to be displayed when each part of music is played. Therefore, CPU 5 reads out the data indicating the type of a keyboard of the music from the header of the music data before starting performance, and can generate an appropriate keyboard image.

By way of the example of the present invention, the performance system has been described, comprising the electronic musical instrument 100 and the television receiver 200, both connected to each other. But the scope of the present invention is not limited to the structure of the embodiment described above. For example, the performance system of the present invention may be comprised of an electronic musical instrument and a monitor display device connected therewith. Further, the performance system of the invention may be comprised of an electronic musical instrument provided with a comparatively large display unit for displaying a keyboard image and performance guide image.

In the embodiment of the electronic musical instrument described above, a program for performance teaching process is previously stored on the program ROM 7, and CPU 5 executes such program. Modification may be made such that a nonvolatile memory such as a flash memory is provided on the electronic musical instrument, and a program for performance teaching process, which is read in from an external recording medium such as CD-ROM or down load from an external server via a network, is installed onto the nonvolatile memory, whereby CPU reads out from the memory and executes such program.

That is, the program installed onto the nonvolatile memory makes the computer execute step A of confirming a pitch range of music to be played, step B of generating a keyboard image based on a mark provided on a keyboard for indicating a position of a key corresponding to a reference pitch and the pitch range confirmed in step A, and a guide image for performance guide, and step C of outputting to a display device the keyboard image and guide image generated in step B.

What is claimed is:

1. A performance teaching apparatus used with a display device, comprising:
a keyboard having a mark indicating a position of a key corresponding to a reference pitch;
a music search unit for confirming a pitch range of music to be played;
an image generating unit for generating a keyboard image corresponding to the pitch range confirmed by the music search unit based on the mark of the keyboard, and for generating a guide image for performance guide; and
an image outputting unit for outputting to the display device the keyboard image and the guide image generated by the image generating unit.

2. The performance teaching apparatus according to claim 1, wherein the image generating unit generates a keyboard image including the minimum number of keys required for representing the pitch range confirmed by the music search unit and a particular image at a position corresponding to the mark of the keyboard.

3. The performance teaching apparatus according to claim 1, wherein the image generating unit makes the display device display a range used for playing the music in the keyboard image generated based on the pitch range confirmed by the music search unit in a different manner from a range not used for playing the music in the generated keyboard image.

4. The performance teaching apparatus according to claim 3, wherein the image generating unit makes the display device display a range in the keyboard image corresponding to a part to be played among plural parts of the music in a different manner from a range in the keyboard image corresponding to a part not to be played in the plural parts of the music.

5. The performance teaching apparatus according to claim 3, wherein the image generating unit makes the display device display a range in the keyboard image corresponding to a phrase of the music which is being played in a different manner from a range in the keyboard image corresponding to a phrase of the music which is not played.

6. The performance teaching apparatus according to claim 1, wherein the guide image generated by the image generating unit includes a fingering image for performance.

7. The performance teaching apparatus according to claim 1, further comprising:
a performance judging unit for making judgment of performance on the keyboard in accordance with the guide image displayed on the display device; and
wherein the image generating unit generates a judgment image representing the result of the judgment made by the performance judging unit.

8. The performance teaching apparatus according to claim 1, wherein the image generating unit generates images of plural ranges of the keyboard image corresponding respectively to plural parts of the music, which images have different colors respectively.

9. A computer readable recording medium storing a computer program for performance teaching process, the computer program, when installed on a computer, making the computer execute:
step A of confirming a pitch range of music to be played;
step B of generating a keyboard image based on a mark provided on a keyboard for indicating a position of a key corresponding to a reference pitch and the pitch range confirmed in step A, and a guide image for performance guide; and
step C of outputting to a display device the keyboard image and guide image generated in step B.

10. The computer readable recording medium storing a computer program for performance teaching process, according to claim 9, wherein the computer program makes the computer execute:
the step B of generating a keyboard image including the minimum number of keys required for representing the pitch range confirmed in step A and a particular image at a position corresponding to the mark of the keyboard.

11. The computer readable recording medium storing a computer program for performance teaching process, according to claim 9, wherein the computer program makes the computer execute:
the step B of making the display device display a range used for playing the music in the generated keyboard image generated based on the pitch range confirmed in step A in a different manner from a range not used for playing the music in the generated keyboard image.

12. The computer readable recording medium storing a computer program for performance teaching process, according to claim 11, wherein the computer program makes the computer execute:
the step B of making the display device display a range in the keyboard image corresponding to a part to be played among plural parts of the music in a different manner from a range in the keyboard image corresponding to a part not to be played in the plural parts of the music.

13. The computer readable recording medium storing a computer program for performance teaching process, according to claim 11, wherein the computer program makes the computer execute:
the step B of making the display device display a range in the keyboard image corresponding to a phrase of the music which is being played in a different manner from a range in the keyboard image corresponding to a phrase of the music which is not played.

14. The computer readable recording medium storing a computer program for performance teaching process, according to claim 9, wherein the guide image generated by the step B includes a fingering image for performance.

15. The computer readable recording medium storing a computer program for performance teaching process, according to claim 9, wherein the computer program makes the computer further execute:
step D of making judgment of performance on the keyboard in accordance with the guide image displayed on the display device; and
the step B of generating a judgment image representing the result of the judgment made in step D.

16. The computer readable recording medium storing a computer program for performance teaching process, according to claim 9, wherein the computer program makes the computer execute:
the step B of generating images of plural ranges of the keyboard image corresponding respectively to plural parts of the music, which images have different colors, respectively.

* * * * *